United States Patent [19]
Odagiri et al.

[11] Patent Number: 5,789,073
[45] Date of Patent: *Aug. 4, 1998

[54] FIBER REINFORCED COMPOSITE MATERIALS

[75] Inventors: Nobuyuki Odagiri, Matsuyama; Shigeru Suzue, Ohtsu; Akimitsu Matsusaki, Ishikawa-ken; Hajime Kishi, Matsuyama; Takeji Nakae, Ohtsu, all of Japan

[73] Assignee: Toray Industries, Inc., Osaka, Japan

[*] Notice: The term of this patent shall not extend beyond the expiration date of Pat. No. 5,028,478.

[21] Appl. No.: 5,181

[22] Filed: Jan. 15, 1993

Related U.S. Application Data

[63] Continuation of Ser. No. 759,921, Sep. 13, 1991, abandoned, which is a continuation of Ser. No. 663,473, Mar. 4, 1991, which is a division of Ser. No. 137,720, Dec. 24, 1987, Pat. No. 5,028,478.

[30] Foreign Application Priority Data

| Dec. 25, 1986 | [JP] | Japan | 61-315116 |
| Jan. 7, 1987 | [JP] | Japan | 62-548 |
| Jan. 7, 1987 | [JP] | Japan | 62-549 |
| Oct. 16, 1987 | [JP] | Japan | 62-262028 |
| Oct. 16, 1987 | [JP] | Japan | 62-262029 |

[51] Int. Cl.⁶ .......................... B32B 5/30; B32B 5/16; B32B 5/28

[52] U.S. Cl. .......................... 428/283; 428/290; 428/294; 428/327; 428/332; 428/902

[58] Field of Search .......................... 428/147, 240, 428/290, 294, 302, 327, 332, 340, 283, 902

[56] References Cited

U.S. PATENT DOCUMENTS

| 4,863,787 | 9/1989 | Gawin | 428/357 |
| 4,957,801 | 9/1990 | Maranci et al. | 428/147 |
| 5,028,478 | 7/1991 | Odagiri et al. | 428/283 |

FOREIGN PATENT DOCUMENTS

| 0041054 | 12/1981 | European Pat. Off. |
| 1299177 | 12/1972 | United Kingdom |

*Primary Examiner*—Alexander Thomas
*Attorney, Agent, or Firm*—Fish & Richardson P.C.

[57] ABSTRACT

Tough laminated composite material which comprise (A) long reinforcing fibers, (B) a matrix resin mixed with the long reinforcing fibers and (C1) a resin, preferably in the form of fine resin particles, forming a phase separate from said matrix resin which is localized in inter-layer zones, wherein 90% or more of said resin (C1) is localized in inter-layer zones and/or wherein the border length factor in the inter-layer zones is 2.5 or more and prepregs used to form the composite materials.

11 Claims, 16 Drawing Sheets

(X 70)

(X70)

(X200)

(X1000)

(X70)

(X200)

(X1000)

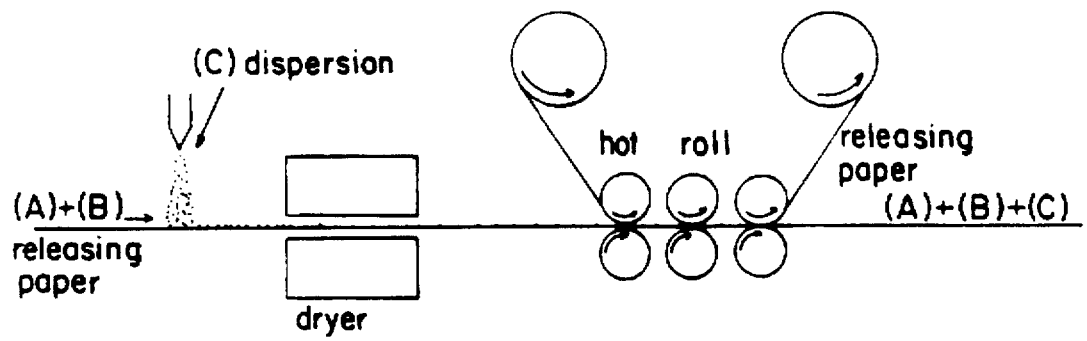
FIG. II
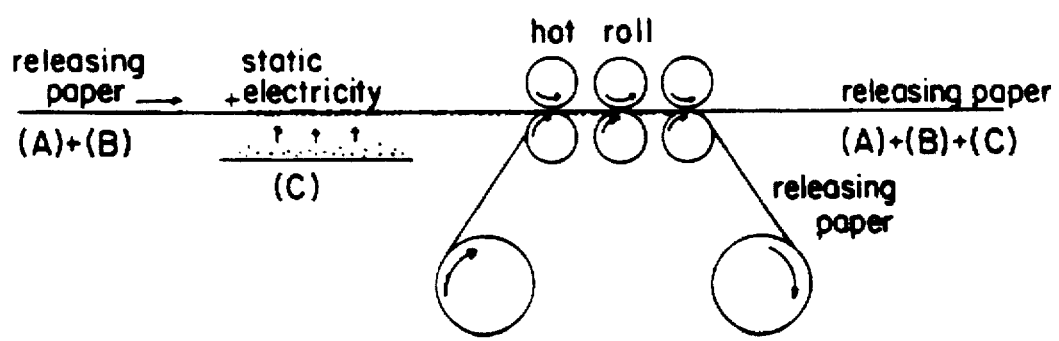
FIG. 12

5,789,073

FIBER REINFORCED COMPOSITE MATERIALS

This application is a continuation of U.S. application Ser. No. 07/759,921, filed Sep. 13, 1991, now abandoned, which is a continuation of Ser. No. 07/663,473, filed Mar. 4, 1991, which is a division of Ser. No. 07/137,720, filed Dec. 24, 1987, now U.S. Pat. No. 5,028,478.

FIELD OF THE INVENTION

The present invention relates to advanced composite materials and prepregs used for structures which must be high in strength, elastic modulus and also in specific strength and specific elastic modulus, which are calculated by dividing the strength or elastic modulus by specific gravity.

More specifically, it relates to composite materials and prepregs remarkably enhanced in the strength in the direction other than the direction of reinforcing fibers, particularly in tensile strength in the non-fiber direction, inter-layer strength, inter-layer toughness, impact resistance and fatigue resistance.

DESCRIPTION OF PRIOR ART

Advanced composite materials are unhomogeneous (heterogeneous) materials having reinforcing fibers and matrix resin as essential components. Consequently, there is a great difference between properties in the fibrous axis direction and in other directions. For example, the resistance to impact by a falling weight (drop weight impact resistance) is governed by the delamination strength, and it is known that although the strength of the reinforcing fibers may be improved this does not necessarily lead to drastic improvement in the delamination strength. Thus, for the purpose of improving the physical properties, improvements by various methods including improving the toughness of the matrix resins have been proposed.

In U.S. Pat. No. 3,472,730 (1969), improvement of the delamination strength is achieved by providing a separate exterior film comprised of an elastomer modified thermosetting resin on one or both surfaces of a fiber reinforced sheet.

In Patent Disclosure SHO 51-58484 (Patent Publication SHO 58-31296), improvement of the moldability and bending strength is achieved by providing a polyester sulfone film on the surface of a fiber reinforced epoxy resin prepreg.

In Patent Disclosures SHO 54-3879, SHO 56-115216 and SHO 60-44334, improvement of the delamination strength with short fiber chips, chopped strands and milled fibers arranged between the layers of a fiber reinforced sheet is disclosed.

In Patent Disclosure SHO 60-63229, improvement of the delamination strength is achieved by providing an elastomer modified epoxy resin film arranged between layers of a fiber reinforced prepreg.

In U.S. Pat. No. 4,539,253 (1985) (corresponding to Patent Disclosure SHO 60-231738), improvement of the delamination strength is achieved by providing between layers of a fiber reinforced prepreg a film having an elastomer modified epoxy resin impregnated to a non-woven fabric, woven fabric, mat or carrier composed of short fibers as a base material.

In U.S. Pat. No. 4,604,319 (1986) (corresponding to Patent Disclosure SHO 60-231738), improvement of the delamination strength with a thermoplastic resin film disposed between the layers of a fiber reinforced prepreg is disclosed.

These methods are not satisfactory in their effects and have shortcomings, respectively. In the case of using a separate exterior film containing an elastomer modified thermosetting resin, the heat resistance decreases with an increasing content of elastomer and so the effect of improving the delamination strength also decreases when a smaller content of elastomer is used.

Where a thermoplastic resin film is used, both the heat resistance and the improvement of the delamination strength are achieved through use of a thermoplastic resin film of good heat resistance, but the tackiness which is an advantage of thermosetting resins in general is lost. Further, thermoplastic resin has a general defect of poor solvent resistance which is reflected in the composite material.

Also, use of short fiber chips, chopped strands or milled fibers increases the inter-layer thickness, resulting in decrease of the strength of the composite as a whole.

SUMMARY OF THE INVENTION

The present invention is directed to a laminated composite material, comprising (A) long reinforcing fibers; (B) a matrix resin mixed with said long reinforcing fibers; and (C1) a resin forming a phase separate from said matrix resin, wherein 90% or more of said resin (C1) is localized in inter-layer zones or a laminated composite material, comprising (A) long reinforcing fibers; (B) a matrix resin mixed with said long reinforcing fibers; and (C1) a resin forming a phase separate from said matrix resin localized in inter-layer zones, wherein the border length factor of component (C1) in the inter-layer zones is 2.5 or more.

The present invention is also directed to a prepreg, comprising (A) long reinforcing fibers; (B) a matrix resin mixed with said long reinforcing fibers; and, (C2) fine resin particles wherein, preferably, 90% or more of the fine resin particles are localized near a surface of the prepreg within a depth which is 30% of the thickness of the prepreg from the surface of the prepreg.

In a more preferred aspect, the present invention is directed to a tough sheet-like laminated composite material formed of a plurality of lamination layers, comprising (A) a plurality of sheet-like layers of carbon or graphite long reinforcing fibers having a length of 5 cm or more which have a tensile strength of at least 450 kgf/mm$^2$ and a tensile ductility of at least 1.6%, said reinforcing fibers within each layer being arranged in a single direction; (B) a matrix resin formed of thermosetting resin or a mixture of thermosetting resin and thermoplastic resin impregnated in said layers of long reinforcing fibers; and (C1) a layer of fine resin particles made from a resin which forms a phase separate from said matrix resin having an average particle diameter of 0.1 to 150 microns which forms an inter-layer zone located between at least two of said layers of long reinforcing fibers, wherein 90% or more of said fine resin particles are localized in inter-layer zones which have a thickness which is 30% of the thickness of said lamination layers and wherein the border length factor of component (C1) is 2.5 or more.

The present invention-is also directed to processes for making the laminated composite materials and prepregs of the invention.

Figure 4:
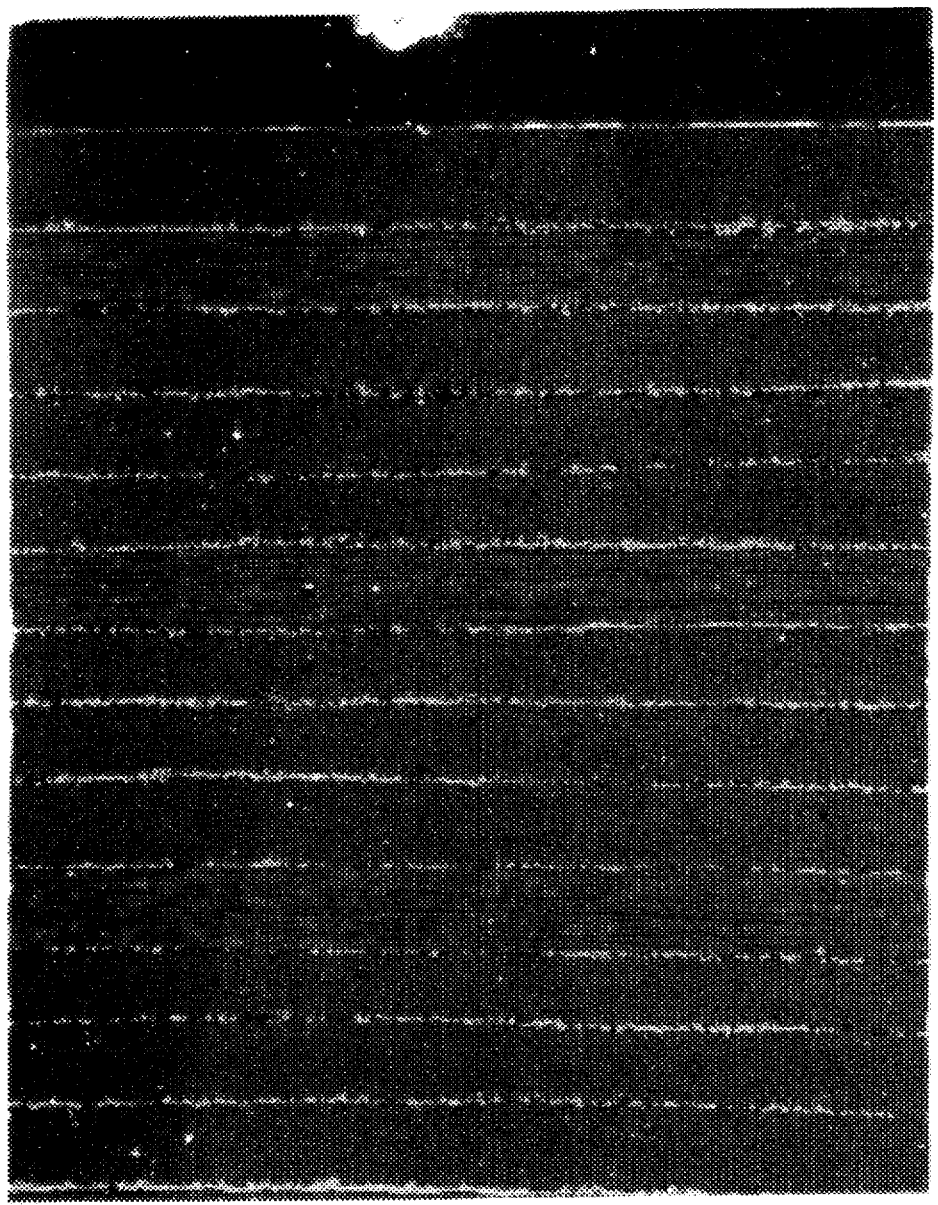
Figure 5:
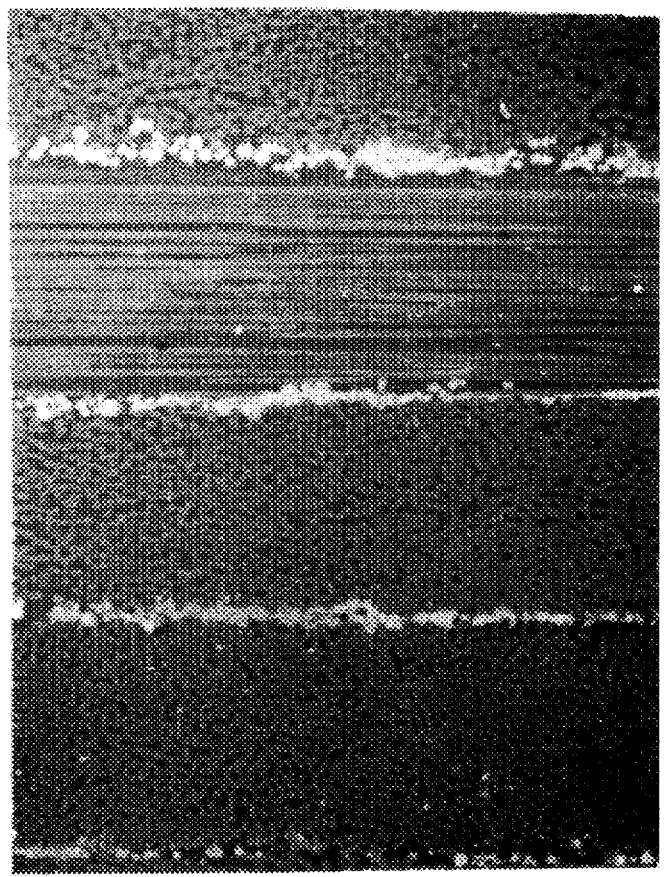
Figure 6A:
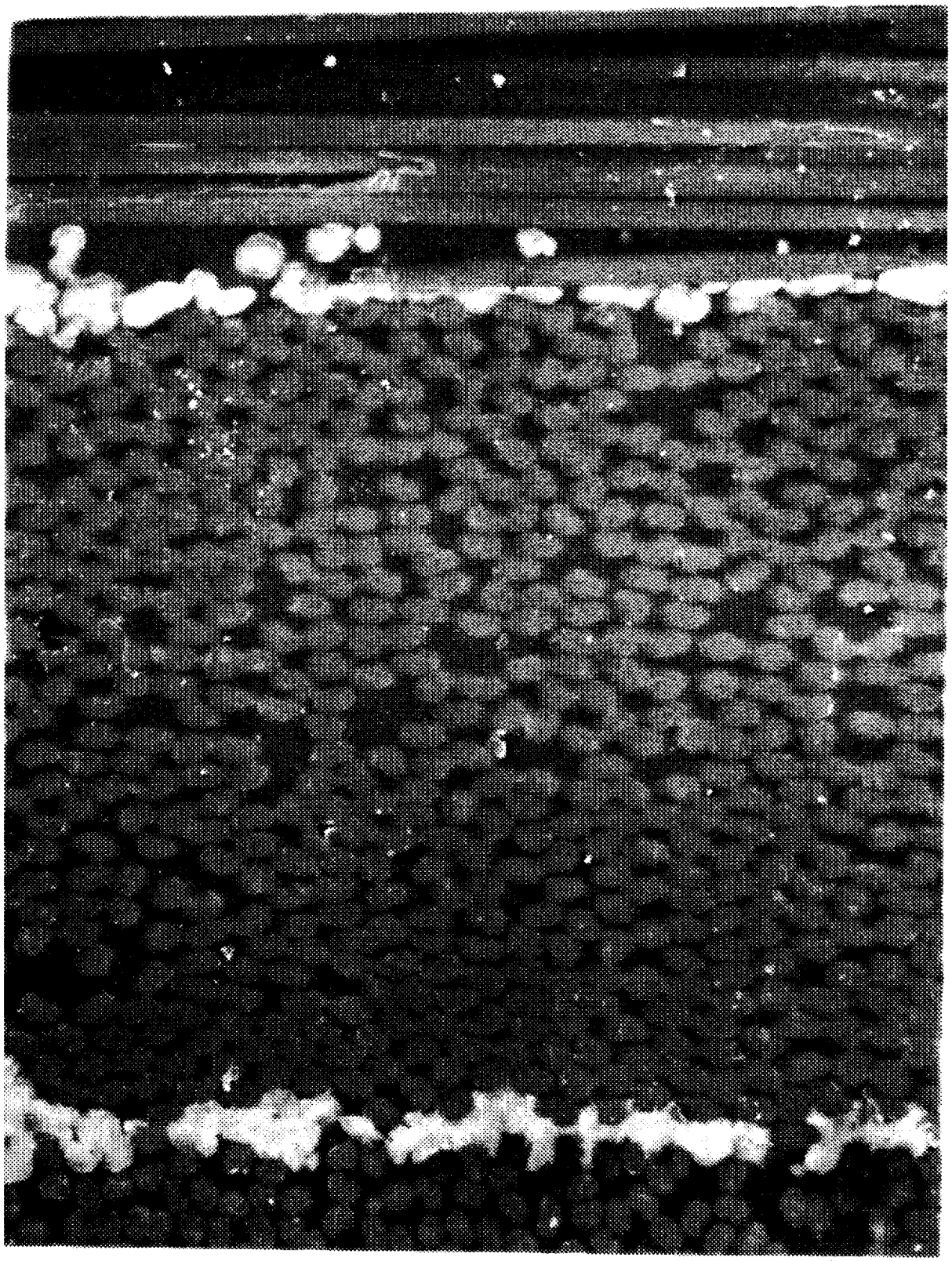
Figure 6B:
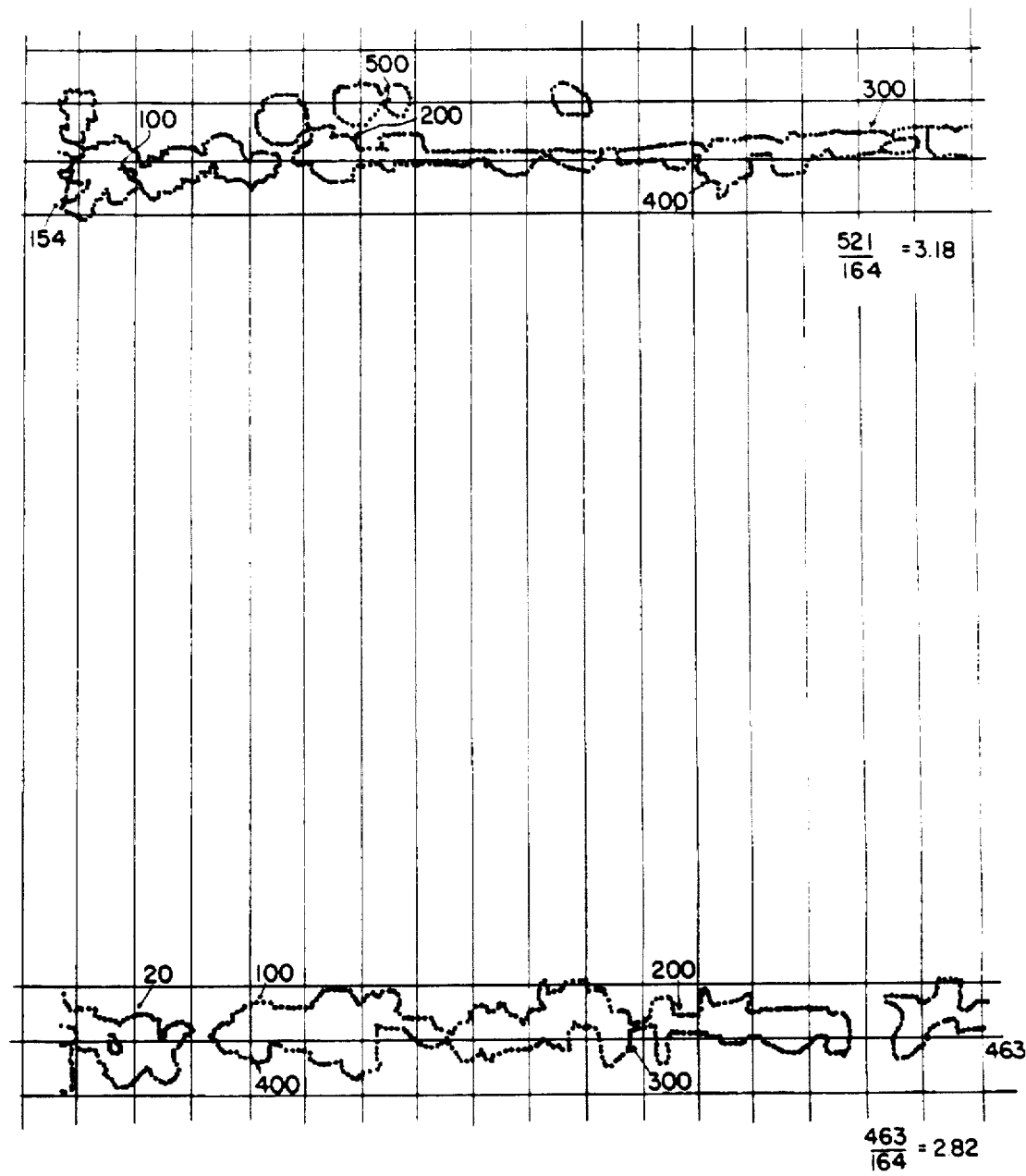

FIGS. 4, 5 and 6(a) are scanning electron microphotographs showing the cross-section of the composite material obtained in Example 2, magnified 70 times, 200 times and 1,000 times, respectively.

Figure 7:
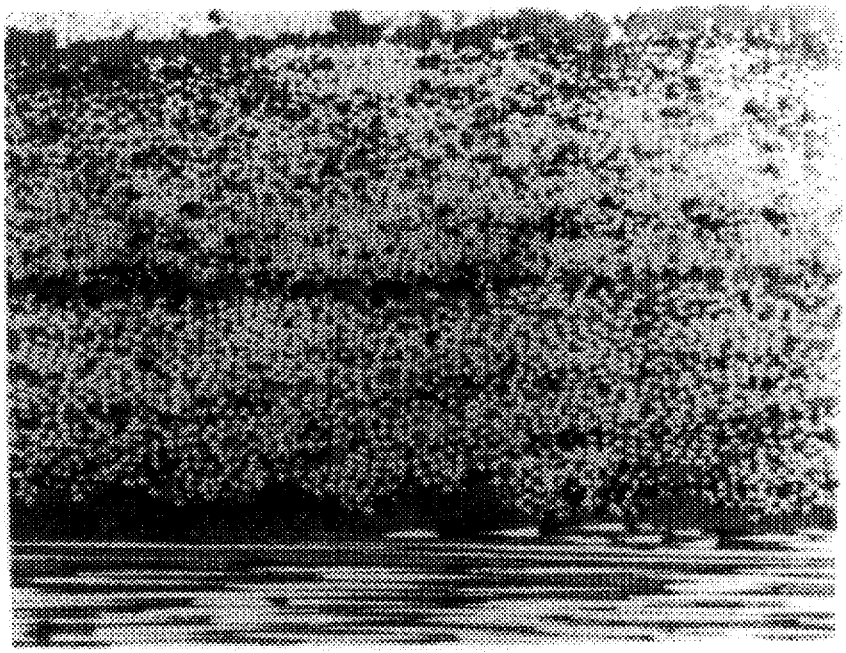
Figure 8:
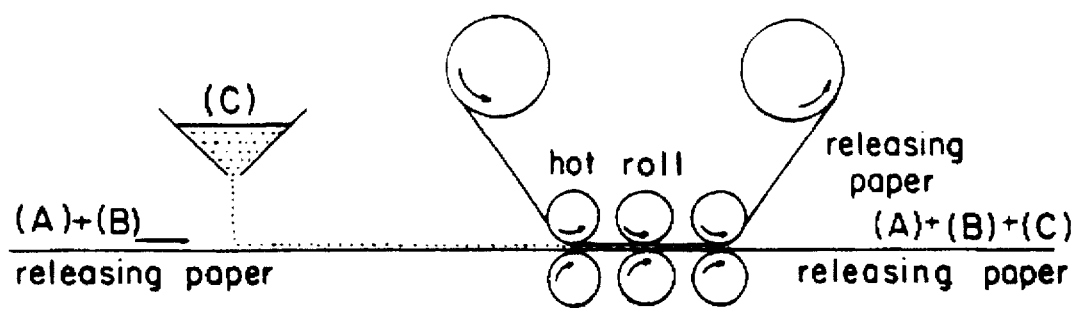
Figure 9:
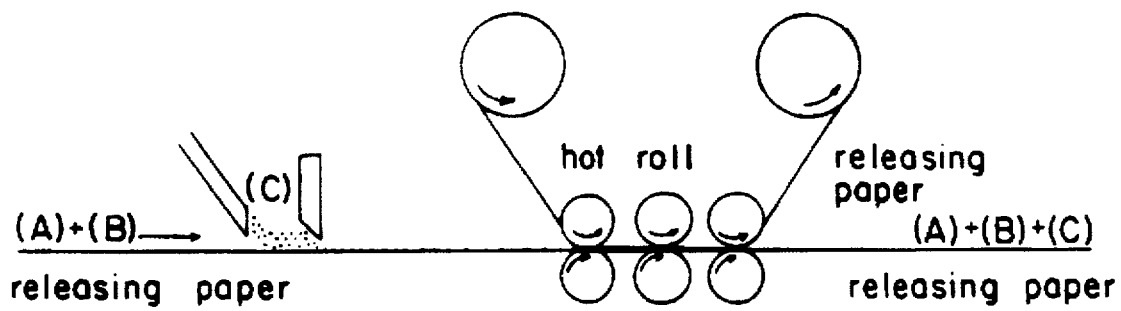
Figure 10:
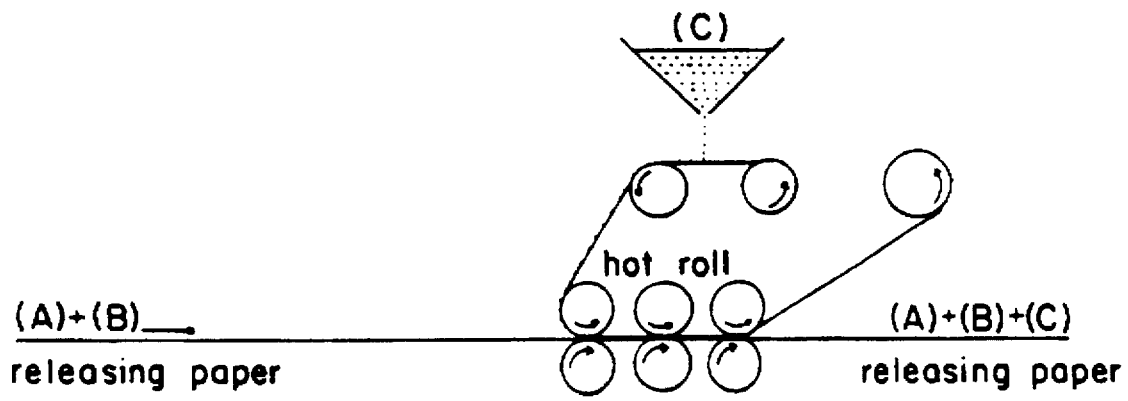

FIG. 7 is a scanning electron microphotograph of the cross-sectional structure of the composite obtained in Example 3, in which the particles are not dyed.

FIGS. 8 to 13 are schematic illustrations of prepreg preparation processes of this invention.

Figure 14A:
Figure 14B:
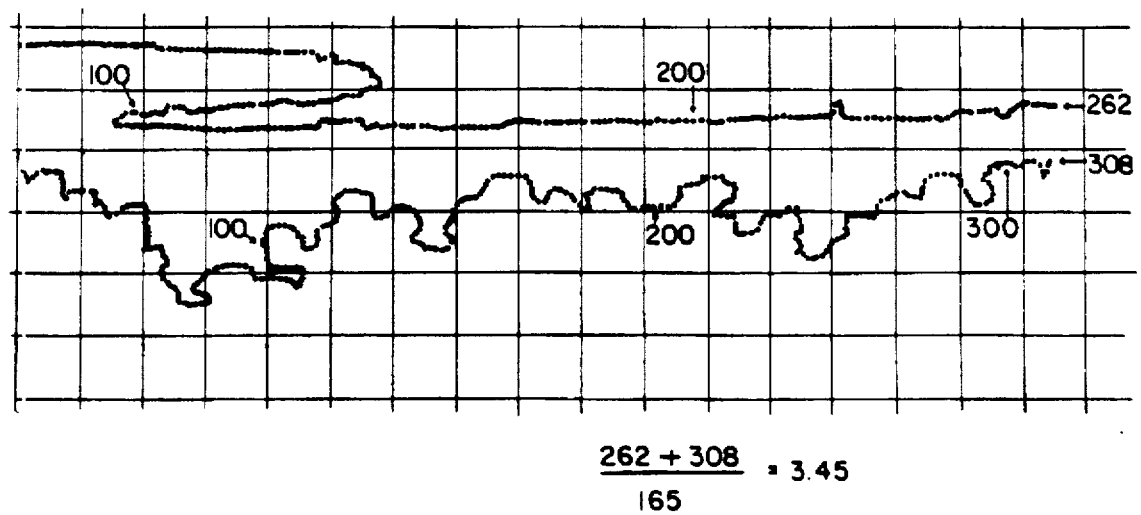
Figure 15A:
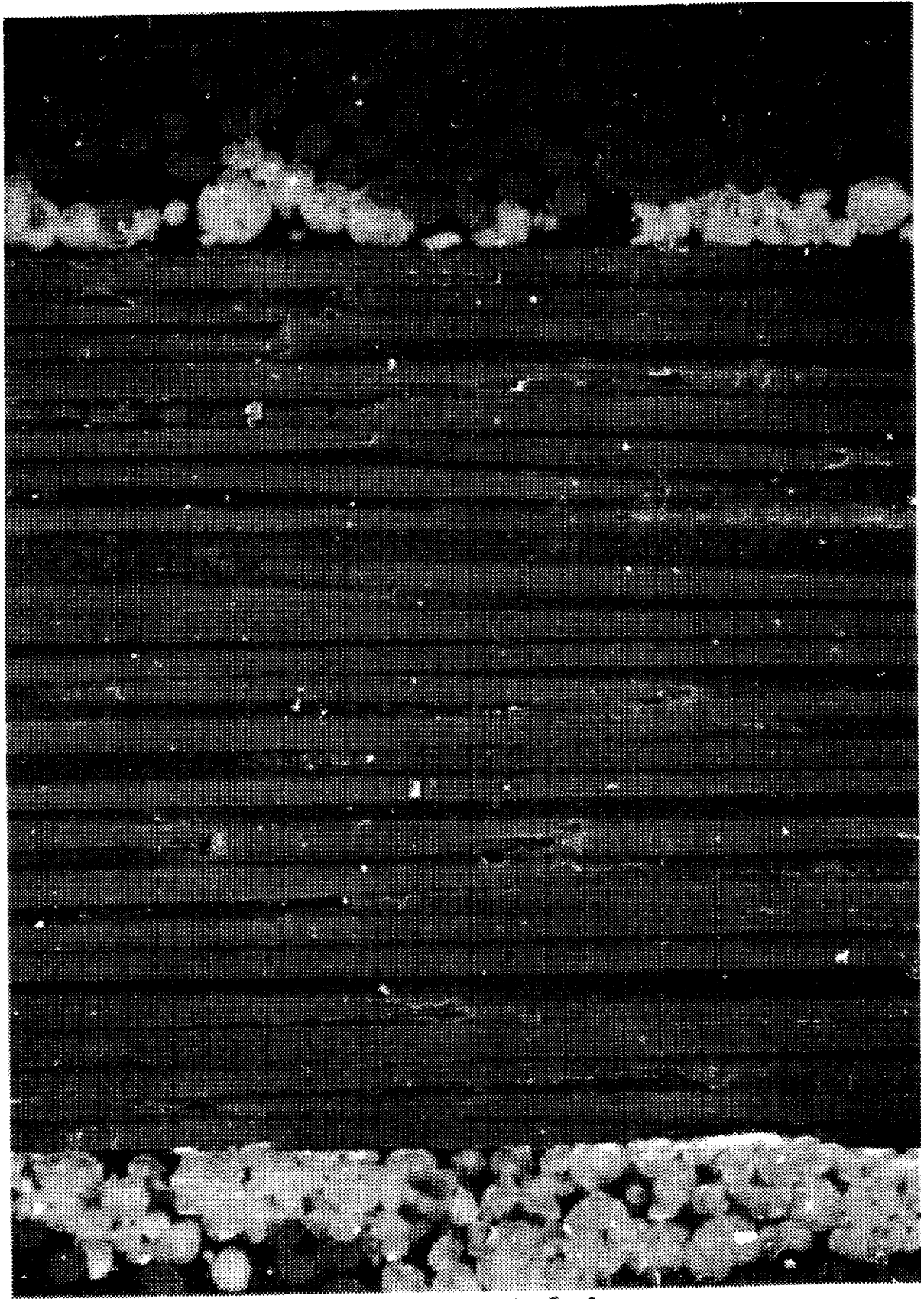
Figure 15B:
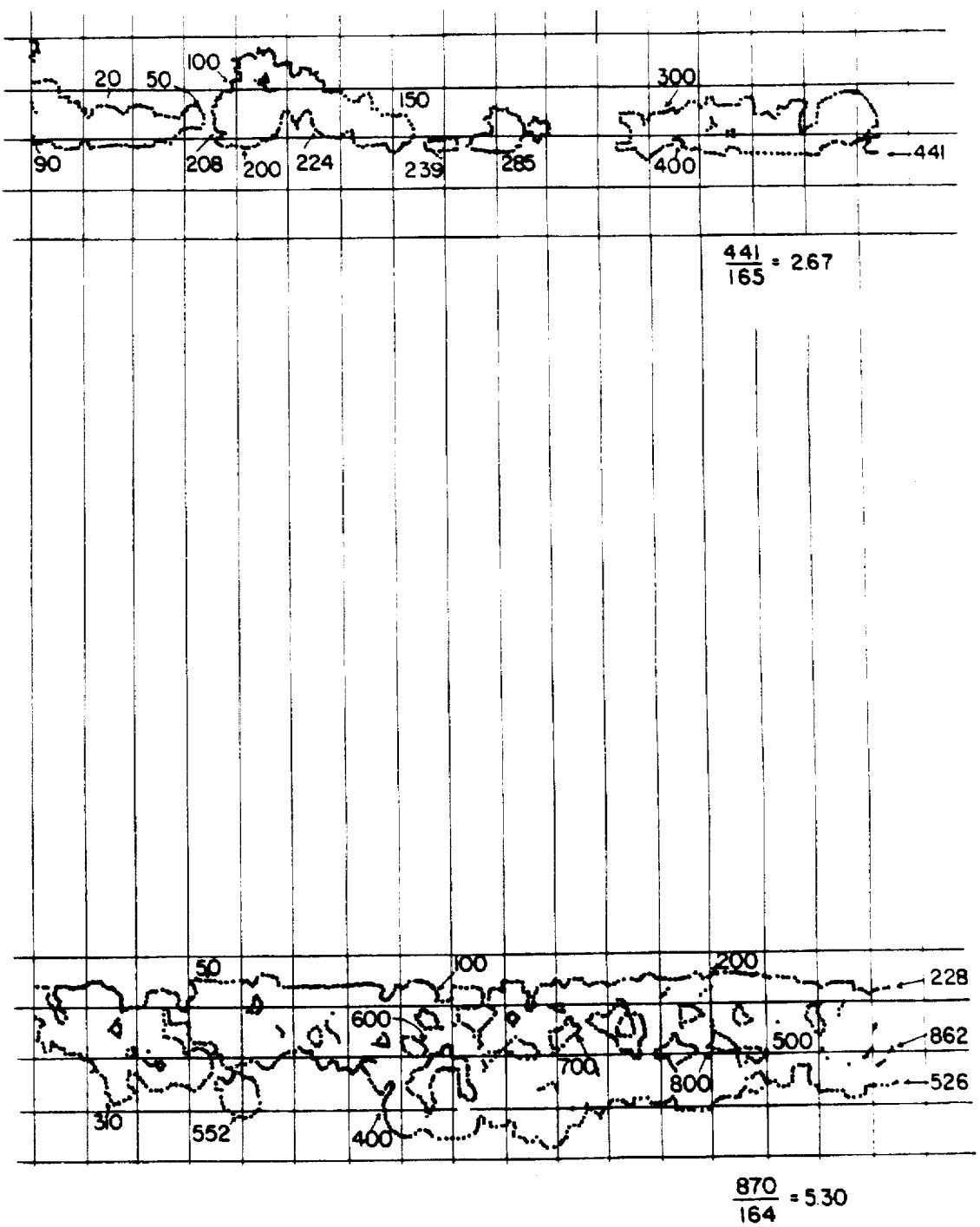

FIGS. 14(a) and 15(a) are scanning electron microphotographs of the composite of Examples 7 and 11, respectively.

FIGS. 3(b), 6(b), 14(b) and 15(b) are dotted (smeared out) papers used for determination of the "border length factor" of the composites of FIGS. 3(a), 6(a), 14(a) and 15(a), respectively.

DESCRIPTION OF THE PREFERRED EMBODIMENTS

The Long Reinforcing Fibers

The component (A) of the present invention is long reinforcing fibers. The reinforcing fibers are fibers which are good in heat resistance and tensile strength of the type that are generally used as high performance reinforcing fibers. They can be selected, for example, from carbon fibers, graphite fibers, aramid fibers, silicon carbide fibers, alumina fibers and boron fibers. Of them, carbon fibers and graphite fibers good in specific strength and specific elastic modulus are most preferred because they contribute considerably to the reduction of weight of the composite material. All kinds of carbon fibers and graphite fibers can be used for respective applications, but high strength, high ductility carbon fibers of 450 kgf/mm$^2$ or more in tensile strength and 1.6% or more in tensile strain are most suitable. The present invention uses long fibers for reinforcing, and those of more than 5 cm in length are preferred. The fibers may be as long as the width or length of the composite material in which they are present. If they are shorter than 5 cm, it is difficult to sufficiently secure the strength of the reinforcing fibers in the composite material. The carbon fibers or graphite fibers can also be mixed with other reinforcing fibers. The form or arrangement of the reinforcing fibers is not restricted. For example, fibers arranged in single direction or a random direction can be used. Fibers in the form of a sheet, a mat, a woven fabric and braided ropes can also be used. For applications requiring high specific gravity and high specific elastic modulus, reinforcing fibers aligned in one direction are the most suitable, but fibers arranged like cloth (woven fabric) which are easy to handle are also suitable in the present invention. In a multilayer laminate a majority of the layers may have parallel fibers arranged in one direction and the remaining layers may have parallel fibers arranged in a direction perpendicular thereto.

The Matrix Resin

The component (B) of the present invention is a matrix resin.

The matrix resin used in the present invention can be a thermosetting resin or a mixture of a thermosetting resin and a thermoplastic resin.

The thermosetting resin used in the present invention is not particularly restricted but it should be a resin which is set or crosslinked by external energy such as heat, light, electron rays, etc., to form at least partially a cross-linked material. A preferable thermosetting resin is an epoxy resin, and in general, it is used in combination with a curing agent or curing catalyst.

The epoxy resin suitable for the present invention is obtained from an amine, phenol, or compound with a carbon-carbon double bond as a precursor. These epoxy resins can be used alone or in admixture.

An epoxy resin can be preferably used in combination with an epoxy curing agent. The epoxy curing agent can be any compound with an active group capable of reacting with the epoxy group. Preferably, it can be selected from compounds with an amino, acid anhydride or azide group.

A mixture of any of the thermosetting resins and a thermoplastic resin can be used as the matrix resin. The thermoplastic resin suitable for the present invention is a thermoplastic resin with bonds selected from carbon-carbon, amide, imide, ester, ether, carbonate, urethane, urea, thioether, sulfone, imidazole and carbonyl bonds in the main chain.

These thermoplastic resins include commercially available polymers, or oligomers lower in molecular weight than the commercially available polymers. As for the oligomers, it is also preferable to use an oligomer with functional groups capable of reacting with the thermosetting resin at the ends of or in the molecular chain.

It is also possible to add a small amount of inorganic particulates such as fine silica powder or elastomer to the epoxy resin.

The matrix resin can be preferably selected from maleimide resin, resins with acetylene end groups, resins with nadic acid end groups, resins with cyanic ester end groups, resins with vinyl end groups and resins with allyl end groups. Any of these resins can also be mixed with an epoxy resin or any other resin. It is also possible to use a reactive diluent and a modifier such as a thermoplastic resin or elastomer, etc.

The maleimide resin is a compound containing an average of two or more maleimide end groups. A preferable resin with cyanic ester end groups is a cyanic ester compound of a polyhydric phenol such as bisphenol A. A cyanic ester resin can be combined especially with bismaleimide resin, to provide a resin suitable for prepregs, and the BT resin made and marketed by Mitsubishi Gas Chemical Co., Inc. is suitable for the present invention. These resins are generally better in heat resistance and water resistance than epoxy resins, but on the other hand, lower in toughness and impact resistance, and therefore are used selectively for specific applications. In the present invention, even if any of these other thermosetting resins are used instead of epoxy resins, the effect of the present invention remains the same. Resins with vinyl end groups and resins with allyl end groups can be selected from commercially available general purpose resins, but since they are inferior to the resins enumerated before in heat resistance, they can be used mainly as diluents.

The Resin which Forms a Phase Separate From Component (B)

Component (C1)

Component (C1) can be any resin as long as it forms a phase separate from the component (B). Usually, either a thermoplastic resin, a thermosetting resin or a resin composed of both of these resins is preferable.

Distribution of Component (C1)

It is important for obtaining a composite material excellent in impact resistance that component (C1) is localized in the inter-layer zones of the composite material and that the contact area with component (B) is large.

When component (C1) is uniformly distributed, the expected effect of modification corresponds to the content of component (C1) in the matrix resin. However, if it is localized in the inter-layer zones of the composite material and secures a wide contact area with the matrix resin and the reinforcing fibers, a remarkable effect far more than expected based on simple addition is obtained, especially concerning the enhancement of impact resistance. Furthermore, the large contact area between component (C1) and the other components is unexpectedly effective in enhancing the fatigue resistance.

The conditions for satisfying the effect are that 90% or more of component (C1) exists in the intermediate portions between respective lamination layers of the composite material and is localized in an inter-layer which has a thickness which is 30% of the thickness of respective lamination layers (these ranges are defined as "inter-layer zones"), and that the value obtained by dividing the total length of the borders of component (C1) in contact with component (B) or (A) in the average inter-layer zone on a cross section, in the layer direction length (hereinafter defined as "border length factor") is 2.5 or more. A lamination layer is a layer existing between the respective center lines of two inter-layer zones. Thus, a single lamination layer includes a layer of long reinforcing fibers impregnated with matrix resin and one half of the component (C1) located on each side of the layer of long reinforcing fibers.

If a large amount of the component (C1) exists beyond the inter-layer zones deep into the layers not in conformity with said conditions, the impact resistance of the composite material is greatly lowered. On the other hand, if 90% or more of the component (C1) is localized in a range which is 10% of the thickness of the layers from the surfaces of the layers, a more remarkable effect can be obtained.

If the border length factor is less than 2.5, the composite material is not sufficiently enhanced in impact resistance or fatigue resistance. If the border length factor is 2.5 or more, both impact resistance and fatigue resistance are excellent, and furthermore, if the border length factor is 3.0 or more, fatigue resistance is further enhanced. Most preferably, the border length factor should be 3.5 or more.

It is required that at least one portion in a cross section of the composite material satisfies these conditions, but preferably, portions corresponding to 30% or more of the whole, more preferably, portions corresponding to 50% or more of the whole should satisfy these conditions.

Method for Evaluating the Distribution of Component (C1)

The distribution of component (C1) in the composite material is evaluated as described below.

At first, the composite material is cut vertically across the lamination layers, and the section is magnified 70 times or more. Then, a photograph of 200 mm×200 mm or more is prepared. The photograph should be taken with the face direction of layers in parallel with one side of the photograph.

This sectional photograph is used to obtain the average thickness of the layers. For the average thickness of layers, the thicknesses of five or more lamination layers are measured at five or more places randomly selected on the photograph, and the total value of the thicknesses is divided by the number of lamination layers.

Then, the section of the same composite material is magnified 500 times or more, to prepare a photograph of 200 mm×200 mm or more. On the photograph, one inter-layer zone is selected, and a line is drawn almost at the center of the inter-layer zone.

Subsequently, two lines which are spaced apart from each other a distance which is 30% of the average thickness of layers obtained before and two lines which are spaced apart from each other a distance which is 50% of the average thickness are drawn symmetrically about the center line. The portion between the two lines which are spaced apart from each other a distance which is 30% of the average thickness of layers on the photograph is the inter-layer zone.

The area of component (C1) in the inter-layer zone and the area of component (C1) in the portion between the two lines which are spaced apart from each other a distance which is 50% of the average thickness of layers are determined, and their ratio is calculated to obtain the rate of component (C1) existing in the inter-layer zone. The area of component (C1) is determined by cutting out all the portions of component (C1) in the predetermined zone from the sectional photograph, and weighing them.

The border length factor is obtained as described below, using a 200 mm×200 mm or more photograph which magnifies a section of the composite material 500 times or more as described above. At first, as mentioned above, one inter-layer zone is selected and lines are drawn to identify the inter-layer zone. Then, tracing paper ruled into 1-millimeter squares is superimposed onto the photograph, and all the 1 mm squares on the border lines between component (C1) and component (B) or (A) in the inter-layer zone are smeared out (blackened). The total number of the squares blackened is taken as the total length in millimeters of the borders between component (C1) and component (B) or (A). This length is divided by the layer direction length (mm) on the photograph, to obtain the border length factor.

When it is difficult to visually discriminate components (C1) and (B), either of them is selectively dyed for observation. Observation can be done also by an optical microscope, but depending on the dye used, the use of a scanning electron microscope may be more suitable for observation.

If component (C1) is localized in the inter-layer zones and a large bonding area is provided with the matrix resin, the internal stress generated when the fiber reinforced composite material is strained by impact, etc., is eased, to retard the fracture under stress and to change a brittle fracture mode into a highly tough fracture mode. It is surmised that this action of the component (C1) is achieved by the large allowable strain of the component (C1) itself, its high adhesiveness to the matrix resin, and the large adhesive interface with the matrix resin based on the distribution style in the matrix resin.

The Fine Particles

Being in the form of fine particles, component element (C2) is present in a matrix resin in a dispersed condition when it is admixed with the matrix resin, and when impregnated to the reinforcing fibers, it maintains the tackiness and drapability of the matrix resin to provide a prepreg which can be easily handled. Accordingly, tackiness and drapability are not required of the fine particles as characteristics so that a large number of materials can be chosen for the fine particles.

Consequently, resins which heretofore are hardly usable as a matrix resin notwithstanding their excellent performance are usable in the form of fine particles as a component constituting a matrix resin to improve the performance of the matrix resin.

Distribution of Fine Particles

When the fine particles are concentrated to a particular part of the matrix resin, the characteristics of the particular part is modified. In the case of a highly anisotropic material such as a composite material, it is not usual that a uniform stress occurs over the whole material. In most cases, the stress concentrates at some particular part. Particularly, in the case of a fiber reinforced composite material obtained by laminating prepreg sheets, when it is subject to an external force such as an impact from the outside, it is known that a great stress is produced between the sheets or layers of the laminate. When highly tenacious fine particles are distributed between the layers in a relatively high concentration, they provide an appreciable effect of improving the interlaminar tenacity.

For improvement of the interlaminar tenacity, it is disclosed in Patent Disclosure SHO 60-231738 to provide a clearly separate layer of film comprised mainly of a thermoplastic resin on one or both surfaces of the prepreg. But, with the fine particles used according to the present invention, it is not required to form such a separate layer. The internal stress occurring when a fiber reinforced composite material is subject to a strain such as impact is distributed in a direction vertical to the layer between the laminates. Here, by having the fine particles present along such distribution and not separating clearly, greater modifying and reinforcing effects will be provided.

The first feature of the composite material here realized is that the matrix resin is in the form of a hybrid of the matrix resin and fine particles and the component materials having unique properties are arranged at appropriate places.

Further, Patent Disclosure 60-231738 discloses a prepreg laminated with a film. However, this film-laminated prepreg does not have tackiness and it is difficult to include a high content of reinforcing fibers in the prepreg because of the difficulties of making a very thin interleaf film of an intended material. Here, the present invention is greatly different from this disclosure in that the dispersion of the fine particles in a certain distribution according to the present invention is entirely free from such problems.

For distribution of the fine particles, it is important for providing a composite material distinguished in impact resistance that the fine particles are present in the surface layer of the prepreg, that is, partially between the prepregs when molded into a composite material.

With the normal addition of fine particles, the modifying effect is expected to an extent commensurate with the content of the fine particles in the matrix resin. But, when the fine particles are partially localized in the surface layer of the prepreg, the modifying effect has greatly exceeded the expectation according to mere addition, and a particularly distinguished effect beyond expectation has been noted in improvement of the impact resistance. The condition for satisfying this is that 90% or more of the fine particles are located near the surface of the prepreg within a depth which is 30% of the thickness of the prepreg from the prepreg surface. If the location of the fine particles does not meet the foregoing condition and the particles are located deep inside the prepreg, the impact resistance of the composite material is inferior to that conforming to the condition.

When 90% or more of the fine particles are located within a depth which is 10% of the thickness of the prepreg from the prepreg surface, the effect is much more appreciable, and such is more preferable. The prepreg according to the present invention has the fine particles partially distributed in both surfaces of the prepreg and allows lamination freely regardless of the upper or lower surface of the prepreg and is, therefore, optimum. However, with prepregs having the fine particles distributed on one side only respectively, a similar effect is obtainable if care is exercised in laminating the prepregs so that the fine particles are present between the prepregs, and so the partial distribution of the fine particles on one side of the prepreg is also included in the present invention.

Evaluation Method of the Distribution of Fine Particles

Evaluation of the condition of distribution of the fine particles in the prepreg is made according to the following method.

First, a prepreg is placed between two flat and smooth supporting plates and pressed tightly. Then, raising the temperature gradually over long hours, it is hardened. Here, it is important to cause gelling at as low a temperature as practicable. If the temperature is raised before gelling occurs, the fine particles are apt to move, precluding evaluation of the exact distribution in the prepreg. After gelling, the temperature is gradually raised over time to harden the prepreg. Then, using the hardened prepreg, a photograph of 200 mm×200 mm or larger with a magnification of 200 times or larger is taken. Using this cross-sectional photograph, the mean thickness of the prepreg is determined. In order to determine the mean thickness, the thickness at least at five places chosen randomly on the picture is measured and the mean value is determined. Next, at the position of 30% of the thickness of the prepreg from the surface in contact with each supporting plate, a line parallel to the facial direction of the prepreg is drawn. Then, the area of the fine particles present between the surface in contact with the supporting plate and the 30% parallel line for each side of the prepreg and also the area of the fine particles present over the whole width of the prepreg is determined. By taking the ratio of the former to the latter, the quantity of the fine particles present within 30% of the thickness of the prepreg is calculated. Determination of the area of fine particles is made by cutting off all part of the fine particles present in a specified region as seen from the cross-sectional picture and determining the weight of such part. To eliminate the effect of partial variation in distribution of the fine particles, it is necessary to carry out such evaluation over the whole width of the picture obtained and, at the same time, to perform a similar evaluation of the pictures at five places chosen randomly and take the mean value.

Where it is difficult to distinguish the fine particles from the matrix resin, either one should be selectively colored for observation. For observation, an optical microscope will do, but depending on the coloring agent, a scanning type electron microscope will be more suitable.

Materials of the Fine Particles

The component element (C2) is fine particles made of a thermoplastic resin, a thermosetting resin, a blend of a thermoplastic resin and a thermosetting resin or a mixture of such particles.

The thermosetting resin used as fine particles refers to all resins such as cross-linkable resins which harden by an external energy such as heat, light or electron beam to form a partially or fully cross-linked resin.

Use of a thermoplastic resin for the fine particles is also preferable for the present invention. Preferable thermoplastic resins to be used in the form of the fine particles according to the present invention are the thermoplastic resins having in the main chain a bond chosen from the carbon-carbon bond, amide bond, imide bond, ester bond, ether bond, carbonate bond, urethane bond, urea bond, thioether bond, sulfone bond, imidazone bond and the carbonyl bond. Specifically, there may be cited vinylic resins represented by polyacrylate, poly(vinyl acetate) and polystyrol, thermoplastic resins belonging to the engineering plastics such as polyamide, polyaramid, polyester, polyacetal, polycarbonate, poly(phenylene oxide), poly (phenylene sulfide), polyallylate, polybenzimidazole, polyimide, polyamideimide, polyetherimide, polysulfone, polyethersulfone and polyetheretherketone, hydrocarbon resins represented by polyethylene and polypropylene and cellulose derivatives such as cellulose acetate and cellulose lactate.

Particularly, polyamide, polycarbonate, polyacetal, poly (phenylene oxide), poly(phenylene sulfide), polyallylate, polyester, polyamideimide, polysulfone, polyethersulfone, polyetheretherketone, polyaramid and polybenzimidazole are distinguished in impact resistance and are suitable as a material for the fine particles used according to the present invention. Of these, polyamide, polyethersulfone and polysulfone are highly tenacious and heat resistant and are preferable for the present invention. Tenacity of polyamide is particularly distinguished, and by using a polyamide such as non-crystalline transparent nylon, heat resistance is provided concurrently.

The fine particles can also be formed from a mixture or blend of a thermosetting resin and a thermoplastic resin. The thermosetting resin and thermoplastic resin in this case can be preferably selected from those enumerated above. For example, if a mixture or blend of a phenol resin and a nylon resin is used, the water absorption coefficient of nylon resin can be lowered to raise the glass transition temperature (Tg), while at the same time maintaining the toughness of nylon resin, and thus, the component (C2) can be excellent in heat resistance and water resistance.

The component (C2) may be fine resin particles which are produced from a combination of a thermosetting resin and a thermoplastic resin and which has, or can develop, a semi-IPN structure. Here, "IPN" is an abbreviation of interpenetrating polymer network, in which crosslinked polymers interpenetrate each other to form a network. On the other hand, the expression a "semi-IPN" denotes an interpenetrating polymer network consisting of a crosslinked polymer and a linear polymer.

It is possible to obtain fine particles which have a high solvent resistance and which can achieve good adhesion with the matrix resin while maintaining the toughness of the particles themselves if the material has a semi-IPN structure consisting of an appropriately selected composition of a thermoplastic resin and a thermosetting resin. Such a semi-IPN may be formed during the process of composite molding. If such material is used as component (C2), composites made up of prepregs prepared from the material will be high in shock resistance, solvent resistance and fatigue resistance.

The thermoplastic resins usable for preparing semi-IPN resin are the same thermoplastic resins as described above. Among them, polyamide, polyetherimide, polyethersulfone, and polysulfone are excellent in toughness and heat resistance, and are easily used to prepare a semi-IPN structure with the thermosetting resins described hereinunder.

Any thermosetting resin may be useful if it can form a semi-IPN structure with the thermoplastic resin with which it is used in combination. Specifically, major materials include epoxy resins, bismaleimide resins, phenolic resins, unsaturated polyester resins and polyimide resins.

For semi-IPN fine particles composed of a thermoplastic resin and thermosetting resin, the content of the thermoplastic resin should be in the range of 30 to 99 weight percent. The fine particles becomes lower in solvent resistance as the content exceeds 99 percent, while at contents below 30 weight percent, the fine particles becomes lower in toughness, resulting in a composite of a decreased shock resistance. The content should preferably be in the range of 50 to 98 percent.

Unexpectedly, a very small weight percentage, two (2) percent for instance, of a thermosetting resin can largely increase the solvent resistance and can sharply raise the fatigue resistance. On the other hand, fine particles of thermoplastic resin decrease in toughness as a result of the formation of a semi-IPN structure with a thermosetting resin and therefore, the resulting composite is generally expected to be lower in shock resistance as compared to the case where fine particles of thermoplastic resin are used alone. Contrary to this expectation, however, it has been found that the shock resistance can increase in the low range of weight percent of thermosetting resin. This may be attributed to an increase in adhesion between the fine particles and matrix resin resulting from the formation of a semi-IPN structure.

If the fine particles selected for component (C2) have, or can develop, a semi-IPN structure consisting of a polyamide and an epoxy resin, the final composite will have well-balanced properties with respect to shock resistance, solvent resistance, fatigue resistance and heat resistance. In addition, it has also been found that the creep properties, which represent a major disadvantage resulting from the application of a thermoplastic resin to the construction of structural material, are improved by the formation of a semi-IPN structure.

The resin of the fine particles should preferably have a strain energy releasing rate $G_{IC}$ of 1500 J/m$^2$ or higher or, more preferably, 3000 J/m$^2$ or higher. A $G_{IC}$ value less than 1500 J/m$^2$ is not preferable in that the final composite material will not have a sufficient impact resistance provided.

The $G_{IC}$ value of the fine particles is evaluated by molding the particles into a plate according to the compact tension method specified in ASTM E399 (Type A4) or the double torsion method.

Heretofore, it was considered to be necessary for improving the impact resistance of the fiber reinforced composite materials to enhance the strain energy releasing rate ($G_{IC}$ value) of the matrix resin. However, to realize the higher strain energy releasing rate, the characteristics which the matrix resin should have such as, for example, modulus of elasticity, rupture elongation, heat resistance, water resisting property, adhesive property, tackiness, softness at room temperature and melt flow of the resin were impaired considerably, and there was a limit for satisfaction of both. But, according to the present invention, by merely having a resin of a certain level of $G_{IC}$ or higher present in the form of fine particles between the layers, the impact resistance as a composite material can be greatly improved.

Form of the Fine Resin Particles

The component (C2) may take any form. It may be in the form of a fine particles made by pulverizing a block of resin or fine particles obtained by a spray dry or reprecipitation method. It may also be in the form of milled fibers having the filaments cut short, needles or whiskers. However, a spherical form is more preferable.

The fine particles are blended in the matrix resin for use, and so the matrix resin having the fine particles blended therein has a viscosity higher than that having no fine particles blended therein.

Normally, a prepreg is produced by first preparing a resin film on a releasing paper in a uniform thickness at a predetermined weight per unit area. Then, the resin film is transferred onto and impregnated into reinforcing fibers. In order to prepare this resin film, it is necessary to have the viscosity of the resin reduced to a viscosity allowing application to the releasing paper at a temperature lower than that at which hardening of the resin takes place.

If the matrix resin has its viscosity increased greatly by blending it with large amounts of the fine particles, it becomes very difficult to produce the prepreg. Consequently, there is a limit on the amount of the fine particles which can be blended.

Also, when the size of the fine particles is reduced, the surface area of the fine particles increases to increase the viscosity of the matrix resin. Therefore, depending on the quantity of the fine particles, there is a limit in the usable size of the fine particles. However, it has been found that according to the present invention, difficulties such as the elevation of the viscosity of matrix resin can be minimized or overcome by having the fine particles formed spherically.

For the fine particles, those of indefinite shape formed by mechanical crushing are usually readily available. However, when compared with the viscosity increase with such fine particles of indefinite shape, the viscosity increase with the spherical fine particles is less than ½. Thus, in producing a prepreg, use of spherical fine particles provides a very great effect in that the restrictions for the amount and for the size of the fine particles are reduced. Further, the fine particles of smaller size can be introduced into the prepreg in a high content to provide an additional effect of being able to reduce the disturbance of the fiber orientation due to presence of the fine particles. This contributes greatly to development of an unexpectedly high strength in the direction of fiber orientation and a stable composite product having little variation in properties.

The Size of the Fine Particles

The size of the fine particles is expressed in terms of the particle diameter, and in this case, the particle diameter means the volume mean diameter obtained by, for example, the centrifugal sedimentation rate method. The diameter of the fine particle may vary according to the intended pattern of distribution. The average particle diameter of the particles can range, for example, from 0.1 to 150 µm, more preferably 0.5 to 60 µm.

When the fine particles are evenly distributed in the matrix resin, a particle diameter of 2 um or less or, more preferably, 0.5 µm or less is suitable, depending on the type and orientation of the reinforcing fiber. If the particle diameter exceeds 2 µm, the particles will hardly penetrate into the clearance between the filaments of the reinforcing fiber and so the uniform distribution becomes difficult.

When it is desired to dispose the fine particles towards the surface rather than inside of the prepreg, a particle diameter within the range of 0.1 µm to 150 µm or, more preferably, 2 µm to 60 µm is suitable, depending on the type and orientation of the reinforcing fiber and the method of producing the prepreg. When the matrix resin including fine particles of a diameter within said range is impregnated into the reinforcing fibers, the fine particles are excluded from the clearance between the reinforcing fibers and are distributed in higher concentration towards the surface of the prepreg. If the fine particles take a greatly anisotropic form such as milled fibers, needles or whiskers, they may be of smaller diameter but they hardly penetrate between the filaments and are present towards the surface of the prepreg.

If, in the process of producing a prepreg, the fine particles are applied to the surface of the prepreg, the fine particles stick to the surface of the prepreg and so the particle diameter is not specifically limited.

If the fine particles have a diameter exceeding 150 µm, they tend to disturb the orientation of the reinforcing fiber filaments or unnecessarily increase the thickness between the layers of the composite material obtained by lamination and thus deteriorate the physical properties of the composite material. The fine particles may have a diameter exceeding 150 µm if they are of a material which dissolves partially in the matrix resin during the process of molding thereby causing a diameter reduction or if the particles are deformed with heat during the molding.

The fine particles may have their initial shape maintained or lost after molding, with advantages and disadvantages in either case, and either is applicable as appropriate depending on the purpose. When the fine particles are of a thermosetting resin, there is little difference in the effect between these cases. But, when they are of a thermoplastic resin, the following difference in effect is produced, and the difference is particularly noticeable in the case of a structure having the fine particles highly concentrated at a particular part such as between the laminates of the composite material.

When the initial shape is maintained, the fine particles of the thermoplastic resin composition are independently dispersed so that the shortcomings of the thermoplastic resin, that is, deterioration upon contact with an organic solvent and creep under a continuous load, do not appear over the matrix resin, and there is provided a composite material which is distinguished in solvent resistance as well as creep. However, if the fine particles have little affinity to the matrix resin, separation of the fine particles and the matrix resin occurs when a stress is produced, and this may become a shortcoming of the material. In this sense, some partial cosolubility or reactivity between the matrix resin and the fine particles is desirable.

On the other hand, when the initial shape of the fine particles disappears after molding, the fine particles of the thermoplastic resin composition integrate to some extent to form a continuous part, and so deterioration of the solvent or creep resistance is a concern. However, if the adhesion between the matrix resin and the fine particles is sufficiently strong, a good composite material free from separation of both under a stress is provided.

Quantity of the Fine Particles

The quantity of the component (C1) is preferably within the range of 1 to 100 parts by weight to 100 parts by weight of the matrix resin. When it is less than 1 part by weight, the effect of the fine particles is scarcely provided, and when it is over 100 parts by weight, blending with the matrix resin becomes difficult, and further the tackiness and draping property of the prepreg are greatly reduced. In order to retain the rigidity of the matrix resin for development of the compressive strength of the composite material, improve the interlaminar fracture toughness of the composite material with fine particles and maintain the characteristics of high rupture elongation and flexibility, a smaller quantity of the fine particles within the range of 1 to 30 parts by weight to 100 parts by weight of the matrix resin is preferable.

Prepreg Production Process

The prepreg may be prepared in many ways, but the following three ways are preferably used.

(1) The prepreg may be prepared by preparing a mixture of a matrix resin (B) and fine resin particles (C2) and applying the mixture to a prepreg made of long reinforcing fibers (A) and a matrix resin (B).

There are no special requirements for the preparation of a prepreg from a reinforcing fiber and a matrix resin and any conventional prepreg preparation method can be used. For example, a prepreg may be prepared by attaching resin-coated sheets to both sides of a plane composed of reinforcing fiber strips placed parallel to each other and then applying heat and pressure to the layered body between impregnating rolls to allow the reinforcing fiber to be impregnated with the resin transferred from the resin-coated sheets (hot-melt process). In another process, a sheet composed of reinforcing fiber strips parallel to each other is immersed in a resin solution diluted with an appropriate solvent and the sheet is then taken out and heated to remove the solvent partially or completely (wet process).

There are two processes for preparing a mixture of a matrix resin and fine particles. In one, a matrix resin and fine particles are mixed in a stirring machine such as a kneader and then spread over the surface of release paper, etc., to form a resin-coated film containing fine particles, while in the other, a film coated with the matrix resin is prepared first and then fine particles are dispersed over it by an appropriate method. For particles having a large particle size, the latter process is preferable because it is difficult to produce a thin coated film by the former process. There are no special requirements for the process of preparing resin-coated film and any conventional coating process may be used.

To combine the prepreg composed of long reinforcing fibers and matrix resin with the coated film made up of matrix resin and fine particles, the coated film may be simply attached to one side or both sides of the prepreg, or impregnating rolls, etc., may be used further to apply heat and pressure to the sheet formed above to allow the prepreg to be impregnated to an appropriate degree. It is also possible to control the tackiness of the surface of the prepreg by adjusting the degree of impregnation.

(2) The prepreg may also be prepared by preparing a mixture of a matrix resin (B) and fine resin particles (C2) and combining said mixture with long reinforcing fibers (A).

For preparation of the mixture of matrix resin and fine particles, two methods are available: one is to first mix the matrix resin and the fine particles in a stirrer such as a kneader and then coat the mixture on a release paper to provide a resin coating film having the fine particles incorporated therein; and the other is to first prepare a coating film of matrix resin and then spread the fine particles thereover by an appropriate method. When the fine particles are of greater diameter, the latter method is preferable in that according to the former method, it is difficult to prepare a thin coating film. The method of producing a resin coating film is not particularly limited, and all of the coating methods heretofore known are applicable.

The method for combining the resin film comprised of fine particles and matrix resin with the reinforcing fiber, or the method of impregnation, is also not limited specifically, and all of the methods of impregnation of the hot melt type heretofore known are applicable. In this case, the fine particles are filtered by the fibers and are present primarily near the prepreg surface.

(3) The prepreg may also be produced by preparing a layer which is a mixture of long reinforcing fibers (A) and a matrix resin (B) and bonding a layer of fine resin particles (C2) to said layer of long reinforcing fibers and matrix resin.

According to the method of the invention, a prepreg comprised of the components (A) and (B) is first produced by a generally known method. Such method is not limited particularly, and the so-called hot melt or wet methods are usable.

According to this method, the component (C2) of fine resin particles is then bonded to one or both surfaces of the foregoing prepreg. For bonding the fine particles to the prepreg, a conventional method of bonding the fine particles flatly and evenly is generally used. As a particularly preferred method for bonding the fine particles to the prepreg, any of the following methods is usable, viz. (1) spreading the fine particles over the prepreg by a spreader (FIG. 8), (2) spreading the fine particles over the prepreg then allowing the prepreg to pass through a clearance of a specified spacing (FIG. 9), (3) bonding the fine particles onto a release paper or film similarly to the method (1) or (2) and then pressing the paper or film onto the prepreg to integrate them (FIG. 10), (4) dispersing the fine particles in a solvent, coating the dispersed liquid onto the prepreg and then drying the coated prepreg to remove the solvent (FIG. 11), and (5) bonding the fine particles to the prepreg by use of static electricity (FIG. 12).

Figure 13:
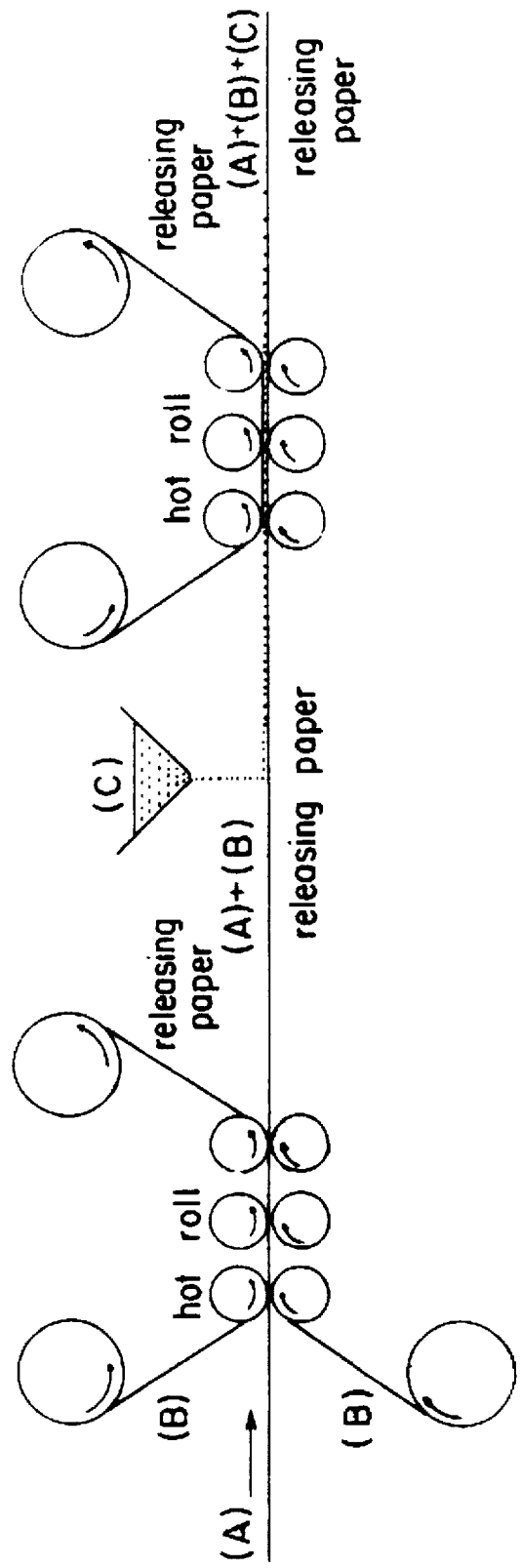

The fine particles may be bonded to one or both surfaces of the prepreg. A method of successively and/or continuously carrying out the production of prepreg and bonding of fine particles for improvement of the production efficiency is schematically shown in FIG. 13.

EXAMPLE 1

A unidirectional prepreg composed as described below was prepared. At first, a prepreg consisting of the following A and B and of 21 wt % in resin content was prepared, and a resin film obtained by thinly coating releasing paper with a blend of C and B was applied onto both sides, respectively. The following amount of C is the amount of particulates contained in the prepreg resin finally obtained through the above two steps.

A. Reinforcing fibers: Carbon fibers T800H (made by Toray Industries, Inc.)

B. Matrix resin: A resin composition composed of the following:
 1) Tetraglycidyl diaminodiphenylmethane (ELM434 made by Sumitomo Chemical Co., Ltd.)—70 parts by weight
 2) Bisphenol A type epoxy resin (Epikote 828 made by Yuka Shell Epoxy K.K.)—10 parts by weight
 3) Bisphenol F type epoxy resin (Epicron 830 made by Dainippon Ink & Chemicals, Inc.)—20 parts by weight
 4) 4,4'-diaminodiphenylsulfone (Sumicure S made by Sumitomo Chemical Co., Ltd.)—45.2 parts by weight C. Amorphous transparent nylon (Particulates of 22u in average grain size obtained by freezing and pulverizing Trogamido T made by Dinamit Nobel)—15 parts by weight The resin content in the prepreg was 30 wt %. The amount of resins per unit area was 69 g/m$^2$ and the amount of carbon fibers per unit area was 149 g/m$^2$.

Then, 32 sheets of the prepreg were laminated quasi-isotropically and molded in an ordinary autoclave at 180° C. for 2 hours at a pressure of 6 kgf/cm².

A section of the molded product was ground, and the amorphous transparent nylon portions were selectively dyed by osmium tetroxide. The section was observed with a scanning electron microscope. The amorphous transparent nylon had formed layers separate from the matrix resin.

Figure 1:
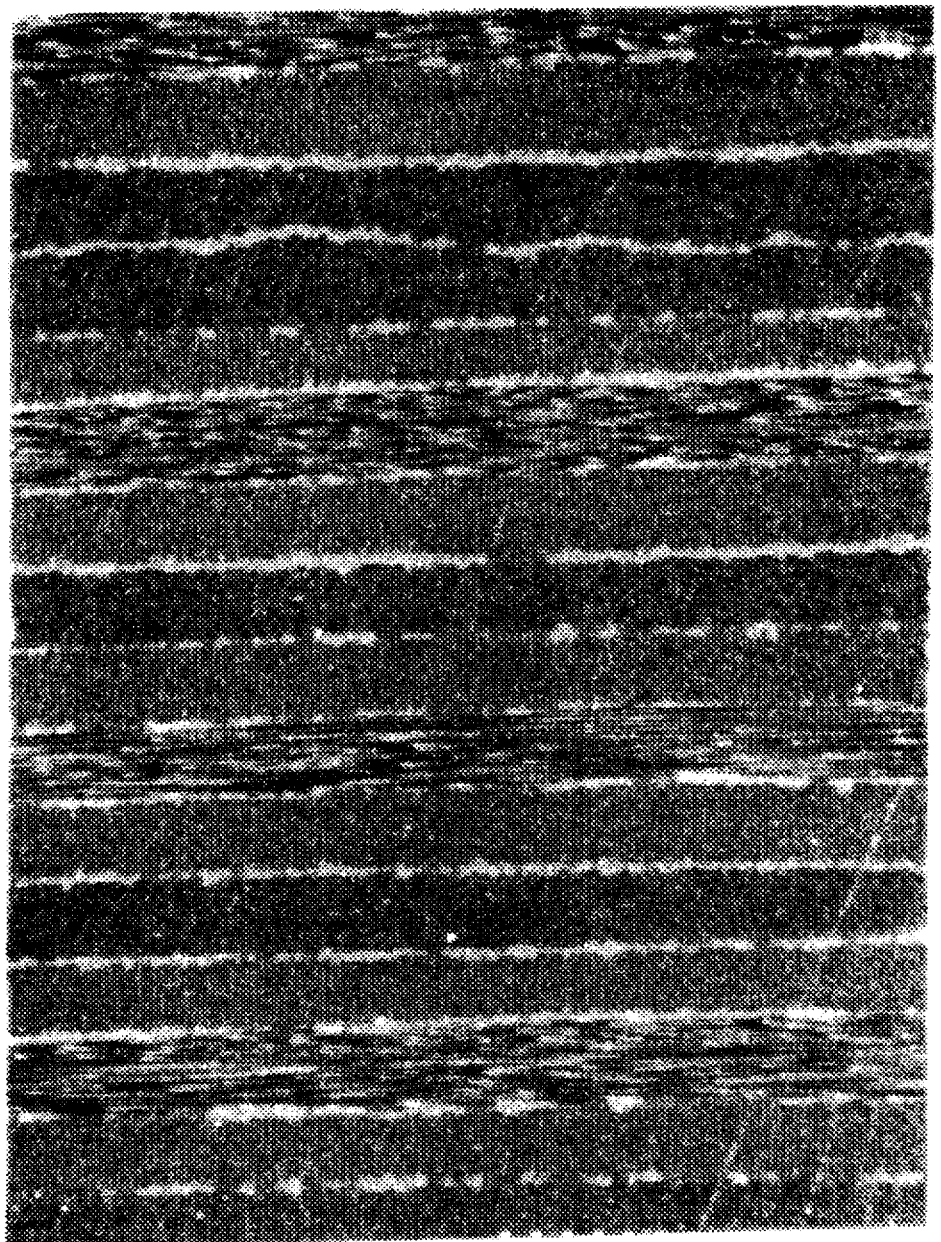
FIGS. 1, 2 and 3(a) are microphotographs taken by a scanning electron microscope showing the cross-section of the composite material obtained in Example 1, magnified 70 times, 200 times and 1,000 times, respectively, in which the particles are dyed separately.
Figure 2:
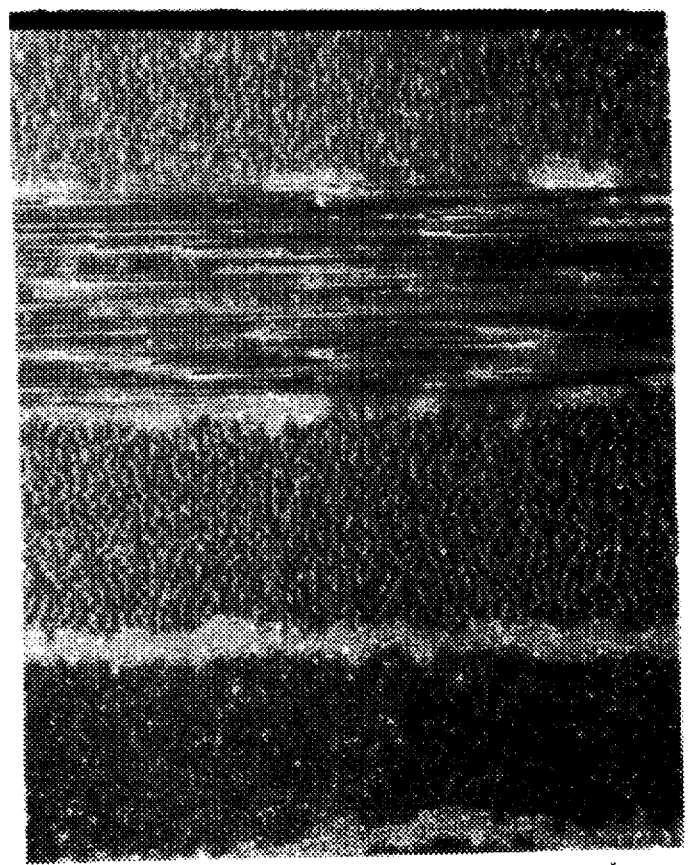
Figure 3A:
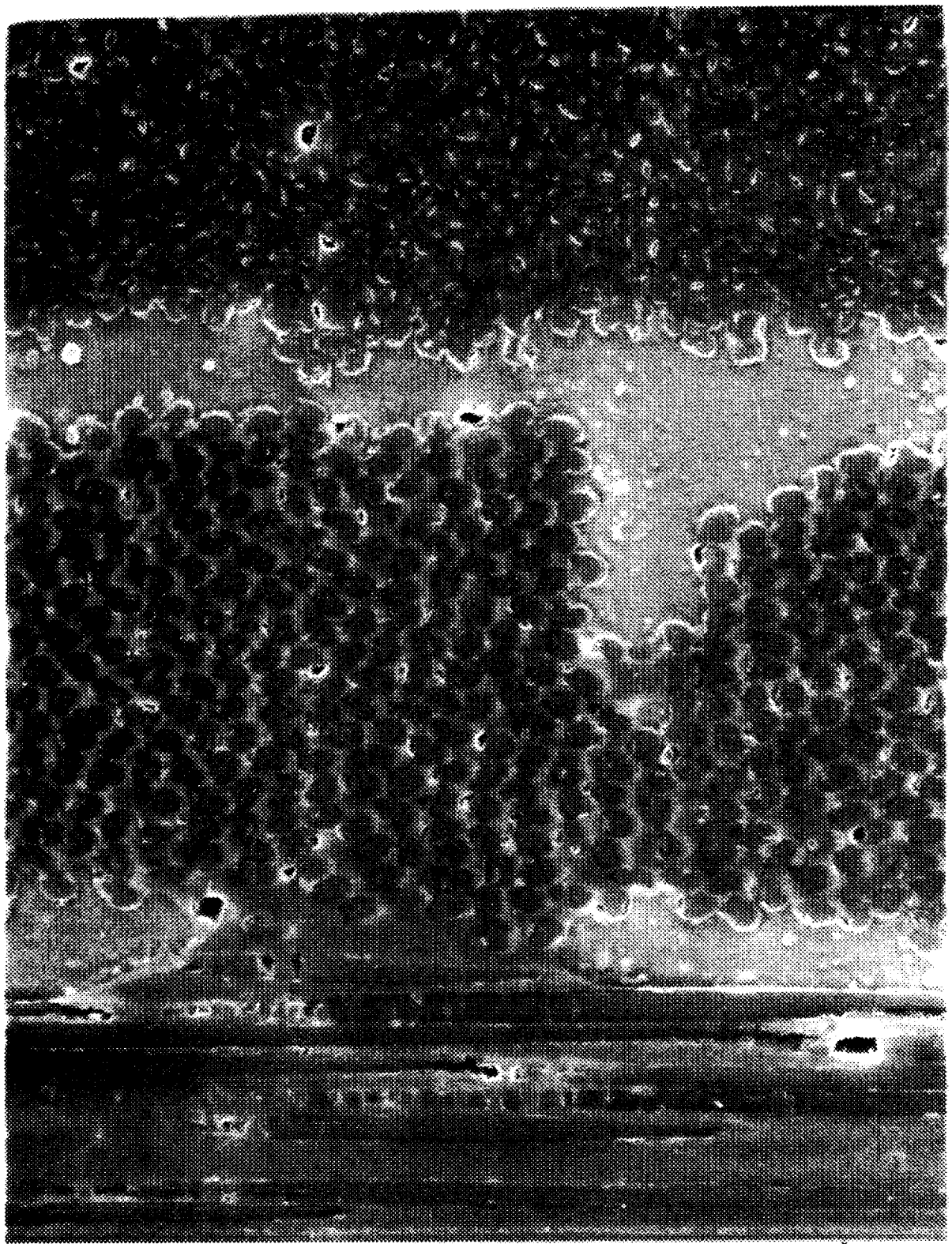
Figure 3B:
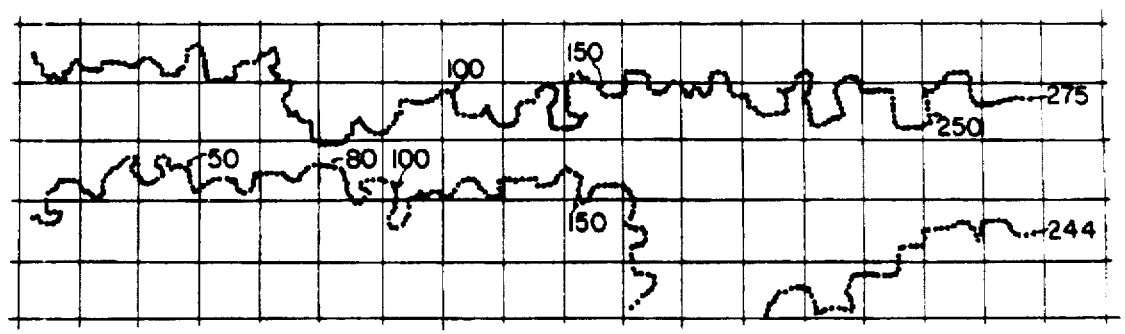

The average thickness of the layers was evaluated using respectively five photographs magnified 70 times and 200 times, and was found to be 156µ. Two of the sectional photographs used are shown in FIG. 1 (70-fold) and FIG. 2 (200-fold). The amorphous transparent nylon was rather bright on the photographs, in contrast to the matrix resin. Then, five sectional photographs showing random portions magnified 1000 times were used to evaluate the amount of the amorphous transparent nylon existing in the inter-layer zones. The amount was 97% (the average width of the inter-layer zones was 46.8µ) which showed that the amorphous transparent nylon had been localized in the inter-layer zones. The same sectional photographs were used to obtain the border length factor which was found to be 3.16 which showed that the contact area was large. One of the sectional photographs used is shown in FIG. 3($a$) (1000-fold).

The hardened quasi-isotropical plate was cut into 150 mm×100 mm specimens, and a drop impact of 1500 inch-pounds/inch was applied to the center of each specimen. The damaged area measured by an ultrasonic flaw detector was 1.2 square inches. After the impact test, the compressive strength was measured according to ASTM D-695 and found to be 30.3 kg/mm².

Fatigue resistance was evaluated by applying a repeated load (tension) in the EDS (edge delamination strength) test mode. As a result, at a stress of 15 kg/mm² peeling was not caused even when the load was repeated $10^6$ times.

EXAMPLE 2

A unidirectional prepreg composed of the following was prepared in the same manner as in Example 1.

A. Reinforcing fibers: Carbon fibers T800H (made by Toray Industries, Inc.)

B. Matrix resin: A resin composition composed of the following:
1) Tetraglycidyl diaminodiphenylmethane (ELM434 made by Sumitomo Chemical Co., Ltd.)—60 parts by weight
2) Bisphenol A type epoxy resin (Epikote 828 made by Yuka Shell Epoxy K.K.)—20 parts by weight
3) Trifunctional aminophenol type epoxy resin (ELM100 made by Sumitomo Chemical Co., Ltd.) —20 parts by weight
4) 4,4'-diaminodiphenylsulfone (Sumicure S made by Sumitomo Chemical Co., Ltd.)—47.3 parts by weight
5) Polyether sulfone 5003P (made by Mitsui Toatsu Chemicals, Inc.)—16 parts by weight C. Nylon 6 grains (SP1000 made by Toray Industries, Inc., average grain size 8 um)—14 parts by weight.

The resin content in the prepreg was 32 wt %. The amount of resin per unit area was 71 g/m² and the amount of carbon fibers per unit area was 148 g/m².

The prepreg was molded as done in Example 1 and a section of it was observed with a scanning electron microscope. Nylon 6 was dyed using phosphorus tungstic acid. Nylon 6 was bright on the photograph and formed layers separate from the matrix resin.

The average thickness of the layers was evaluated in the same manner as in Example 1 and found to be 159µ. The amount of the Nylon 6 existing in the inter-layer zones was 98%, and the border length factor was 4.3. Other portions show border length factors of 3.18 and 2.82.

Three of the sectional photographs used for evaluation are shown in FIG. 4 (70-fold), FIG. 5 (200-fold) and FIG. 6 (1000-fold).

The hardened quasi-isotropic plate was cut into 150 mm×100 mm specimens and a drop weight impact of 1500 inch-pounds/inch was applied to the center of each specimen. The damaged area was measured by an ultrasonic flaw detector and found to be 0.7 square inches. After the impact test, compressive strength was measured according to ASTM D-695 and found to be 36.2 kg/mm².

Then, the fatigue resistance was evaluated with a repeated load (tension) applied in the EDS (Edge Delamination Strength) test mode. As a result, at a stress of 15 kg/mm², peeling was not caused even when the load was repeated $10^6$ times.

EXAMPLE 3

A unidirectional prepreg of the following composition was prepared. The prepreg was produced by the method of first impregnating the matrix resin to the reinforcing fibers and then spraying the fine particles on both surfaces of the impregnated reinforcing fibers. The matrix resin per unit area was 69 g/m², and the carbon fiber per unit area was 152 g/m². The fine particles per unit area were 5.2 g/m².

It was confirmed through optical microscopic observation that the fine particles were evenly distributed on both surfaces of the prepreg.

(1) Reinforcing fiber—Carbon Fiber T800H (product of Toray).

(2) Matrix resin—Resin composition of the following components.
1) Tetraglycidyl diaminodiphenylmethane (product of Sumitomo Chemical Co., Ltd., ELM 434)—90 parts by weight.
2) Bisphenol F type epoxy resin (product of Dainippon Ink & Chemicals, Inc., Epicron 830)—10 parts by weight.
3) 4,4'-diaminodiphenylsulfone (product of Sumitomo Chemical Co., Ltd., Sumicure S)—35 parts by weight.
4) Polyethersulfone 5003P (product of ICI)—15 parts by weight.

(3) Fine particles—Nylon 12 particles, SP-500 (mean particle diameter, 7 µm; product of Toray).

Forty-eight sheets of this prepreg were pseudo-isotropically laminated and molding by an ordinary autoclave was made at 180° C. for 2 hours under a pressure of 6 kgf/cm². After lamination, the composite material had a thickness of 6.5 mm and the volume content of the carbon fiber was 60%. Observing the cross-section of the composite material by an optical microscope, the nylon particles were in a more or less flat spherical form and were melted to one another from place to place to produce a discontinuous form in the matrix resin, and they were concentratively distributed in between the layers, being lesser toward the inside. A photomicrograph is shown in FIG. 7.

The pseudo-isotropic hardened plate was cut in a size of 254 mm in length and 124 mm in width and had a drop weight impact of 1000 inch-pound/inch applied at the center. Then, the damaged area was measured by an ultrasonic flaw detector and it was 2.1 square inches. Thereafter, the compressive strength after impact was measured according to ASTM D-695 and it was 30.9 kgf/mm².

Next, 16 sheets of this prepreg were unidirectionally laminated and molded similarly into a composite material having a thickness of about 2 mm which was then subjected to a tensile test in a direction vertical to that of the fiber under a width 25.4 mm, length 228.6 mm, testing length 127 mm and displacement speed 1.27 mm/min. The tensile strength was 9.0 kgf/mm².

EXAMPLE 4

The particles were sprayed on both surfaces of the impregnated reinforcing fibers as described in Example 3. "Grilamide" TR-55 (product of Emser Welke) was milled by an impact type milling machine and classified into a particle diameter of 30 um or less. Using this, a unidirectional prepreg of the following composition was produced. The matrix resin per unit area was 69 g/m² and the carbon fiber per unit area was 151 g/m². The amount of the fine particles per unit area was 5.2 g/m². Here, it was observed by an optical microscope that the fine particles were evenly dispersed on both surfaces.

(1) Reinforcing fiber—Carbon Fiber T800H (product by Toray).

(2) Matrix resin—Same as in Example 3.

(3) Fine particle—Grilamide (particle diameter, 30 μm or less).

Forty-eight sheets of this prepreg were pseudo-isotropically laminated and were molded and evaluated similarly to Example 3. After applying a drop weight impact of 1000 inch-pound/inch to the center, the damaged area was measured by an ultrasonic flaw detector and it was 2.0 square inches. Subsequently, the compressive strength after impact was measured according to ASTM D-695 and it was 33.0 kgf/mm². Also, a tensile test was made in a direction vertical to that of the fiber and the tensile strength was 9.2 kgf/mm².

EXAMPLE 5

The particles were sprayed on both surfaces of the impregnated reinforcing fibers as described in Example 3. Polybutyleneterephthalate (product by Toray) was milled by an impact type milling machine and classified into a particle diameter of 30 μm or less. Using this, a unidirectional prepreg of the following composition was produced. The matrix resin per unit area was 69 g/m² and the carbon fiber per unit area was 150 g/m². The amount of the fine particles per unit area was 5.2 g/m². It was observed by an optical microscope that the fine particles were evenly dispersed on both surfaces of the prepreg.

(1) Reinforcing fiber—Carbon Fiber T800H (product of Toray).

(2) Matrix resin—Same as that in Example 3.

(3) Fine particles—Polybutyleneterephthalate (particle diameter, 30 μm or less).

Forty-eight sheets of this prepreg were psueod-isotropically laminated and were molded and evaluated similarly to Example 3. After applying a drop weight impact of 1000 inch-pound/inch to the center, the damaged area was measured by an ultrasonic flaw detector and it was 2.8 square inches. Then, the compressive strength after impact was measured according to ASTM D-695 and it was 23.4 kgf/mm².

Example 5 failed to show as high a post impact compressive strength as Examples 3 or 4. This suggests that the adhesion between the fine particles and the matrix resin is strong with Nylon 12 or Grilamide but is relatively weak with polybutyleneterephthalate. However, the post impact compressive strength is obviously better than that of Comparative Example 2.

EXAMPLE 6

The particles were sprayed on both surfaces of the impregnated reinforcing fibers as described in Example 3. Using the same fine particles as those of Example 4, a unidirectional prepreg of the following composition was produced. The matrix resin per unit area was 69 g/m² and the carbon fiber per unit area was 150 g/m². The amount of the fine particles per unit area was 5.2 g/m².

It was observed by an optical microscope that the fine particles were evenly dispersed over both surfaces of the prepreg.

(1) Reinforcing fiber—Carbon Fiber T800H (product of Toray).

(2) Matrix resin—Resin composition of the following components.
  1) 2,2-bis(4-maleimidephenyl)methane—8.5 parts by weight.
  2) 2,2-bis(cyanatophenyl)propane—76.5 parts by weight.
  3) Bisphenol F type epoxy resin (Epicron 830, product of Dainippon Ink & Chemicals, Inc.).
  4) Dicumyl peroxide—0.1 part by weight.
  5) Polyethersulfone 5003P (product of Mitsui Toatsu) —9 parts by weight.

(3) Fine particles—Grilamide (mean particle diameter, 30 μm).

Forty-eight sheets of this prepreg were pseudo-isotropically laminated and were molded and evaluated similarly to Example 1. After applying a drop weight impact of 1000 inch-pound/inch to the center, the damaged area was measured by an ultrasonic flaw detector and it was 2.0 square inches. Then, the compressive strength after impact was measured according to ASTM D-695 and it was 30.9 kgf/mm².

Also, a tensile test was made in a direction vertical to that of the fibers, and the tensile strength was 9.0 kgf/mm².

EXAMPLE 7

A unidirectional prepreg of the following composition was produced.

The production was made by first preparing a prepreg containing 22% by weight of a resin comprised of A and B described below, then pasting a resin film having a blend resin of C and B spread in a thin layer on a release paper onto each surface of the prepreg.. The parts by weight of C stated later represent the quantity of the fine particles contained in the finally obtained prepreg through the foregoing two processes.

A: Reinforcing fibers—Carbon Fiber T800H (product of Toray Co.).

B: Matrix resin—Resin composition of the following components.
  1) Phenol novolak type epoxy resin (Epicoat 154, product of Yuka Shell Epoxy Co.)—60 parts by weight
  2) Bisphenol A type epoxy resin (Epikote 828, product Yuka Shell Epoxy Co.)—40 parts by weight
  3) 4,4'-Diaminodiphenylsulfone (Sumicure S, product of Sumitomo Chemical Co., Ltd.)—33.9 parts by weight

19

4) Polyethersulfone 5200G (product of Mitsui Toatsu—10 parts by weight

C: Fine particles—Fine particles of an average size of 15μ obtained by freeze pulverization of a non-crystalline transparent nylon (Trogamide T, product of Dinamit Nobel)—15 parts by weight The weight percentage of the resin in the obtained prepreg was 33%. The quantity of the resin per unit area was 72 g/m² and that of the carbon fiber was 146 g/m². This prepreg was held between two smooth Teflon plates and hardened with the temperature raised gradually to 150° C. over a period of seven days, and the cross-section was observed. Evaluating the quantity of the fine particles present within the range of 30% of the thickness of the prepreg from the surface of the prepreg, it was found to be 96%. The cross-sectional observation was made with the fine particles selectively colored by osmium tetraoxide by use of a scanning type electron microscope.

Next, 32 sheets of this prepreg were pseudoisotropically laminated and molded according to a conventional method by an autoclave at 180° C. for 2 hours under a pressure of 6 kgf/cm². After molding, the cross-section was observed by an optical microscope and it was found that the fine particles were concentrated in the interlaminar part of the laminated plate. The border length factor was 3.45.

The psuedo-isotropically hardened plate was cut into a size of 150 mm by 100 mm, and a drop weight impact of 1500 inch-pound/inch was applied to the center. The damaged area was determined by an ultrasonic flaw detector and it was found to be 2.0 square inches. Then, according to ASTM D-695, the compressive strength after impact was measured and it was 31.2 kg/mm².

Next, using the same prepreg, a unidirectional 16-ply laminate was molded into a composite material having a thickness of about 2 mm which was cut into a length of 228.6 mm in the filament direction and a width of 25.4 mm and subjected to a tensile test at a right angle to the fibrous direction at a test length of 127 mm and a displacement speed of 1.27 mm/min. The tensile strength was 9.0 kg/mm².

EXAMPLE 8

A undirectional prepreg as stated below was prepared. The prepreg was produced as follows. A prepreg which consisted of A and B defined below and had a resin content of 22 weight percent was prepared, and then resin sheets consisting of a blend of C and B being spread over release paper were attached to both sides of the prepreg. The content of C in parts by weight shown below represents the amount of the fine particles contained in the final prepreg resin obtained after the above two-step process.

A. Reinforcing fiber—carbon fiber T800H (Toray Industries, Inc.)

B. Matrix resin—resin with the following composition
 1) Tetraglycidyl diaminodiphenylmethane (ELM434, Sumitomo Chemical Co., Ltd.)—80 parts by weight
 2) Aminophenolic epoxy resin (0510, Ciba-Geigy)—20 parts by weight
 3) 4,4'diaminodiphenylsulfone (Sumicure, Sumitomo Chemical Co., Ltd.)—53.4 parts by weight C. Semi-IPN fine particles—semi-IPN fine particles with an average particle diameter of 16μ consisting of a mixture of 96/3/1 in weight ratio of amorphous transparent nylon (Grilamide TR-55, Emser Welke), Bisphenol A epoxy resin (Epikote 828, Yuka Shell Epoxy) and polyamide-based curing agent (Tohmide #296, Fuji Chemical Corp., Ltd.)—21 parts by weight.

20

The content of resin in the resultant prepreg was 34 weight percent. The weight of resin and carbon fiber per unit area was 60 g/m² and 149 g/m², respectively.

The prepreg was sandwiched between two Teflon plates with smooth surfaces and heated by raising the temperature very gradually until it reached 150° C. in seven (7) days to ensure curing. Then its cross sections were observed. The amount of the fine particles contained in the 30%-thickness surface layer of the prepreg was evaluated and found to be 98 percent, indicating that particles were localized in the inter-laminar portion. The observation of cross sections was carried out by performing selective dying of the fine particles with osmium tetroxide and examining them by scanning electron microscopy.

Next, 32 sheets of the prepreg were piled up in a quasi-isotropic arrangement and subjected to an ordinary mold process in an autoclave at 6 kgf/cm² and 180° C. for two (2) hours. After the molding, cross sections were observed by optical microscopy. It was confirmed that semi-IPN fine particles were localized in portions between the lamination layers.

A 150 mm lengthwise×100 mm crosswise piece was cut out of the quasi-isotropic cured plate and subjected to a drop weight impact of 1,500 inch-pound/inch. Observation by a supersonic crack detector showed that the damage area was 0.7 square inches. Then, the compressive strength after impact was measured according to ASTM D-695 and found to be 37.5 kg/mm².

A unidirectional 16-ply laminated plate was prepared from the same prepreg, and a 1 cm lengthwise×10 cm crosswise piece was cut out of it and boiled in methyl ethyl ketone for 24 hours. No whitening was seen on the surface. The flexural strength of the test piece was 178 kg/mm², which was nearly equal to the 177 kg/mm² measured before immersion.

Fatigue resistance was evaluated after repeatedly applying a (tensile) load in the EDS test mode. No separation was found after a load of 20 kg/mm² was repeatedly applied 10⁶ times.

EXAMPLE 9

The semi-IPN fine particles used here had an average particle diameter of 20μ and consisted of a mixture of 70/30/10 in weight ratio of polyethersulfone 5003P (Mitsui Toatsu Chemicals, Inc.), bisphenol A epoxy resin (Epikote 828, Yuka Shell Epoxy) and 4,4'-diaminodiphenylmethane (Nakarai Chemicals, Ltd.). The same procedure as in Example 2 was carried out. A test piece was subjected to a drop weight impact of 1,500 inch-pound/inch. Observation by a supersonic crack detector showed that the damage area was 2.0 square inches. Then, the compressive strength after impact was measured according to ASTM D-695 and found to be 30.1 kg/mm². The laminated plate was boiled in methyl ethyl ketone for 24 hours. No change in appearance was noticed.

EXAMPLE 10

A unidirectional prepreg of the following composition was produced. The production was made by first preparing a prepreg containing 21% by weight of a resin comprised of A and B described below, then pasting a resin film having a blend of C and B spread in a thin layer on a release paper onto each surface of the prepreg. The parts by weight of C stated later represent the quantity of the fine particles contained in the finally obtained prepreg through the foregoing two processes.

A: Reinforcing fiber—Carbon Fiber T800H (product of Toray Co.).

B: Matrix resin—Resin composition of the following components.
   1) Phenol novolak type epoxy resin (Epicoat 154, product of Yuka Shell Epoxy Co.)—60 parts by weight
   2) Bisphenol A type epoxy resin (Epicoat 828, product of Yuka Shell Epoxy Co.)—40 parts by weight
   3) 4,4'-Diaminodiphenylsulfone (Sumicure S, product of Sumitomo Chemical Co., Ltd.)—33.9 parts by weight
   4) Polyethersulfone 5200G (product of Mitsui Toatsu) —10 parts by weight C: Fine particles—Fine particles of an average size of 15μ obtained by freeze pulverization of a polyamideimide (Toron 4000T, product of Amoco Co.)—15 parts by weight The weight percentage of the resin in the obtained prepreg was 30%. The quantity of the resin per unit area was 69 g/m², and that of the carbon fiber per unit area was 149 g/m².

The polyamideimide was press molded into a resin plate. The $G_{IC}$ value by the compact tension method according to ASTM E399 was measured and it was 2350 J/m².

This prepreg was held between two smooth Teflon plates and hardened while raising the temperature gradually to 150° C. over a period of seven days. The cross-section was observed. Evaluating the quantity of the fine particles present within the range of 30% of the thickness of the prepreg from the surface of the prepreg,, it was found to be 96% to indicate that the fine particles were well localized in the inter-laminar region. Cross-sectional observation was made with the fine particles selectively colored by osmium tetraoxide by use of a scanning type electron microscope.

Next, 32 sheets of this prepreg were pseudo-isotropically laminated and molded according to a conventional method by means of an autoclave at 180° C. for 2 hours under a pressure of 6 kgf/cm². After molding, the cross-section was observed by an optical microscope and it was found that the fine particles were concentrated in the interlaminar part of the laminated plate.

The pseudo-isotropically hardened plate was cut into a size of 150 mm by 100 mm, and a drop weight impact: of 1500 inch-pound/inch was applied to the center. Then, the damage area, as determined by an ultrasonic flaw detector, was found to be 2.2 square inches. Then, according to ASTM D-695, the compressive strength after impact was measured and it was 30.2 kg/mm².

EXAMPLE 11

A prepreg was produced through two steps of resin impregnation. First, a resin composition of the following components was prepared.
   1) Tetraglycidyl diaminodiphenylmethane (ELM 434, product of Sumitomo Chemical Co., Ltd.)—60 parts by weight
   2) Bisphenol A type epoxy resin (Epicoat 828, product of Yuka Shell Epoxy Co.)—40 parts by weight
   3) 4,4'-Diaminodiphenylsulfone (Sumicure S, product of Sumitomo Chemical Co., Ltd.)—42 parts by weight
   4) Polyethersulfone 5200G (product of Mitsui Toatsu— 10 parts by weight This resin composition was applied onto a release paper to provide a resin film for impregnation to the carbon fiber T800H (product of Toray) oriented in one direction, and there was obtained a primary prepreg. Next, to the foregoing resin composition, 30 parts by weight of Nylon 6 spherical particles SP-1000 (mean particle size, 15μ; product of Toray) were blended in a kneader. This resin mixture had a viscosity of 150 poise as measured at 80° C. The resin mixture was heated to 80° C. and applied onto a releasing paper with a reverse coater and a resin film of uniform thickness was obtained. Using this resin film and applying it to each surface of the primary prepreg prepared as above for impregnation of the resin, a unidirectional prepreg having fine particles on the surfaces was produced.

The content by weight of the resin in the prepreg was 32%. The quantity of the resin per unit area was 71 g/m² and that of the carbon fiber per unit area was 149 g/m².

This prepreg was held between two smooth Teflon plates and hardened while raising the temperature gradually to 150° C. over a period of seven days. The cross-section was observed. The quantity of the fine particles present in the range of 30% of the thickness of the prepreg from the surface of the prepreg was 96%. Cross-sectional observation was made with the fine particles selectively colored by phosphotungustic acid by use of a scanning type electron microscope.

Next, 32 sheets of this prepreg were pseudoisotropically laminated and molded according to a conventional method by means of an autoclave at 180° C. for 2 hours under a pressure of 6 kgf/cm². After molding, the cross-section was observed by an optical microscope, and it was found that the fine particles were concentrated in the interlaminar part of the laminated plate. The border length factors were 2.67 and 5.30.

The quasi-isotropically hardened plate was cut into a size of 150 mm by 100 mm and a drop weight impact of 1500 inch-pound/inch was applied to the center. The damaged area was determined by an ultrasonic flaw detector and it was found to be 0.5 square inches. The compressive strength after impact measured according to ASTM D-695 was 42.4 kg/mm².

COMPARATIVE EXAMPLE 1

A prepreg was prepared as in Example 1, except that the amorphous transparent nylon was not used, and it was alternately laminated with a 15μ thick amorphous transparent nylon (Trogamido T made by Dinamit Nobel) film prepared separately. The laminate was molded and further processed as in Example 1.

A section of it was observed with a scanning electron microscope. The amorphous transparent nylon had formed layers separate from the matrix resin.

The rate of the amorphous transparent nylon existing in the inter-layer zones was 100% which showed that the amorphous transparent nylon had been localized in the inter-layer zones. However, the border length factor was 2.2 which showed that the contact area between the amorphous transparent nylon and the matrix resin or carbon fibers was very small.

The hardened quasi-isotropic plate was cut into 150 mm×100 mm specimens and a drop weight impact of 1500 inch-pounds/inch was applied to the center of each specimen. The damaged area was measured by an ultrasonic flaw detector and found to be 1.6 square inches. After the impact test, the compressive strength was measured according to ASTM D-695 and found to be 27.0 kg/mm², i.e., lower than that of Example 1.

As for the fatigue resistance in the EDS mode, after a stress of 15 kg/mm² was applied 2×10⁵ times, edge delamination occurred.

COMPARATIVE EXAMPLE 2

A unidirectional prepreg similar to Examples 3 to 5, except that the fine particles were not included, was prepared. The matrix resin per unit area was 75 g/m² and the carbon fiber per unit area was 150 g/m².

Forty-eight sheets of this prepreg were pseudoisotropically laminated and were molded and evaluated as in Example 3. After applying a drop weight impact of 100 inch-pound/inch to the center, the damaged area was measured by an ultrasonic flaw detector and was found to be 8.6 square inches. Then, according to ASTM D-695, the compressive strength after impact was measured and found to be 18.1 kgf/mm². Also, a tensile test was made in a direction vertical to that of the fiber and the tensile strength was 8.3 kgf/mm².

COMPARATIVE EXAMPLE 3

A unidirectional prepreg similar to that of Example 6, except that the fine particles were not included, was prepared. Forty-eight sheets of this prepreg were pseudo-isotropically laminated and were molded and evaluated as in Example 3. After applying a drop weight impact of 1000 inch-pound/inch to the center, the damaged area was measured by an ultrasonic flaw detector and was found to be 8.8 square inches. Then, according to ASTM D-695, the compressive strength after impact was measured and to be 18.0 kgf/mm². A tensile test was also made in a direction vertical to that of the fiber and the tensile strength was 8.1 kgf/mm².

We claim:

1. A fiber reinforced thermosetting resin matrix prepreg containing reinforcing fibers having an outer resin layer apart from the reinforcing fibers at one or both surfaces of the prepreg, said outer resin layer comprising particles of thermoplastic resin of particle diameters in the range of from 0.1 to 150 microns, wherein 90% or more of the thermoplastic resin particles are located within a depth which is 30% of a thickness of the prepreg determined from the prepreg surface.

2. The prepreg of claim 1, wherein the thermoplastic resin particles have diameters in the range of from 0.5 to 60 microns.

3. The prepreg of claim 1, wherein 90% or more of the thermoplastic resin particles are located within a depth which is 10% of a thickness of the prepreg determined from the prepreg surface.

4. The prepreg of claim 1, wherein the thermoplastic resin is selected from the group consisting of polyacrylate, poly(vinyl acetate), polystyrol, polyimide, polyacetal, poly(phenylene oxide), poly(phenylene sulfide), polyallylate, polyamideimide, polyamide, polysulfone, polyethersulfone, polyaramid, polyetherimide, polycarbonate, polyester, polybenzamidazole, polypropylene, polyethylene, and cellulose derivatives.

5. A laminated fiber reinforced thermosetting resin composite which has been made by laminating several prepregs at least one of which is the prepreg of claim 1.

6. A laminated fiber reinforced thermosetting resin composite comprising at least one resin layer separating fiber layers in the laminated composite, said resin layer comprising particles of thermoplastic resin in a matrix resin, wherein 90% or more of the thermoplastic resin particles are localized in inter-layer zones which have thicknesses which are 30% of thickness of a total combined thickness of each fiber layer and each resin layer.

7. The composite of claim 6, wherein the amount of thermoplastic resin in the resin layer separating fiber layers is within the range of 1 to 30 parts by weight to 100 parts by weight of the matrix resin.

8. A method of making a fiber reinforced thermosetting resin prepreg, comprising the steps of providing a fiber layer containing reinforcing fibers and applying to the fiber layer thermoplastic resin particles of diameters in the range of from 0.1 to 150 microns in a thin resin layer apart from the fiber layer at one surface of the prepreg, so as to make a prepreg in which 90% or more of the thermoplastic resin particles are located within a depth which is 30% of a thickness of the prepreg determined from the prepreg surface.

9. The method of claim 8, wherein the thermoplastic resin particles have diameters in the range of from 0.5 to 60 microns.

10. A fiber reinforced thermosetting resin matrix prepreg containing reinforcing fibers having an outer resin layer apart from the reinforcing fibers at one or both surfaces of the prepreg, said outer resin layer comprising particles of thermoplastic resin of particle diameters in the range of from 0.1 to 150 microns, there being substantially no thermoplastic resin particles within the fiber layer of the prepreg.

11. A method of making a fiber reinforced thermosetting resin prepreg, comprising the steps of providing a fiber layer containing reinforcing fibers and applying to the fiber layer thermoplastic resin-particles of diameters in the range of from 0.1 to 150 microns in a thin resin layer apart from the fiber layer at one surface of the prepreg so that there are substantially no thermoplastic resin particles within the fiber layer of the prepreg.

* * * * *